United States Patent
Ohsawa et al.

(10) Patent No.: US 7,450,158 B2
(45) Date of Patent: Nov. 11, 2008

(54) SPECTRUM AND COLOR REPRODUCTION SYSTEM TO CONVERT A COLOR SIGNAL FROM A COLOR-IMAGE INPUT INTO A COLOR SIGNAL FOR A COLOR-IMAGE OUTPUT

(75) Inventors: Kenro Ohsawa, Tokyo (JP); Hideto Motomura, Yokohama (JP)

(73) Assignee: National Institute of Information and Communications Technology, Kaganei-shi (JP)

( * ) Notice: Subject to any disclaimer, the term of this patent is extended or adjusted under 35 U.S.C. 154(b) by 681 days.

(21) Appl. No.: 10/492,260

(22) PCT Filed: Oct. 22, 2002

(86) PCT No.: PCT/JP02/10935

§ 371 (c)(1),
(2), (4) Date: Apr. 12, 2004

(87) PCT Pub. No.: WO03/036989

PCT Pub. Date: May 1, 2003

(65) Prior Publication Data

US 2004/0246345 A1    Dec. 9, 2004

(30) Foreign Application Priority Data

Oct. 22, 2001    (JP)    ............... 2001-323922

(51) Int. Cl.
  *H04N 5/238*    (2006.01)
(52) U.S. Cl. .................................... 348/222.1; 386/117
(58) Field of Classification Search .............. 348/231.1, 348/207.9, 333.02, 222.1
See application file for complete search history.

(56) References Cited

U.S. PATENT DOCUMENTS

| 4,574,319 A | 3/1986 | Konishi |
| 5,255,083 A | 10/1993 | Capitant et al. |

(Continued)

FOREIGN PATENT DOCUMENTS

EP    1 231 776 A1    8/2002

(Continued)

OTHER PUBLICATIONS

Supplementary European Search Report dated Mar. 13, 2008, issued in EP Appln. No. 0280260-0-1228 which is a European counterpart of related U.S. Appl. No. 10/492,259.

*Primary Examiner*—Tuan Ho
(74) *Attorney, Agent, or Firm*—Frishauf, Holtz, Goodman & Chick, P.C.

(57) ABSTRACT

A spectrum and color reproduction system has a multi-band camera (1), a six-primary-color display (3), and an image converting device (2) which converts a 16-band photographing signal from the multi-band camera (1) into a 6-primary-color display signal of the six-primary-color display (3) by using an input profile of the multi-band camera (1) and an output profile and a color spatial converting profile of the six-primary-color display (3). The input profile and the output profile have information on a corresponding relationship between the respective color signals and one of a spectrum and a spectral reflectance, and the color spatial converting profile has one of a color matching function and an illumination-light spectrum which prescribes a reflection spectrum for the spectral reflectance.

6 Claims, 19 Drawing Sheets

U.S. PATENT DOCUMENTS

| | | | |
|---|---|---|---|
| 5,864,364 A * | 1/1999 | Ohyama et al. | 348/211.14 |
| 5,982,416 A | 11/1999 | Ishii et al. | |
| 6,466,334 B1 * | 10/2002 | Komiya et al. | 358/1.9 |
| 6,657,658 B2 | 12/2003 | Takemura | |
| 6,728,472 B1 * | 4/2004 | Fujita et al. | 386/68 |
| 2003/0038954 A1 | 2/2003 | Odagiri et al. | |
| 2004/0257447 A1 * | 12/2004 | Ohsawa et al. | 348/207.99 |

FOREIGN PATENT DOCUMENTS

| | | |
|---|---|---|
| JP | 07-182481 A | 7/1995 |
| JP | 10-105036 A | 4/1998 |
| JP | 2000-278707 A | 10/2000 |
| JP | 2000-341499 A | 12/2000 |
| JP | 2000-341715 A | 12/2000 |
| JP | 2001-008220 A | 1/2001 |
| JP | 2001-045493 A | 2/2001 |
| JP | 2001-136543 A | 5/2001 |
| JP | 2001-245307 A | 9/2001 |
| JP | 2001-258047 A | 9/2001 |

* cited by examiner

SPECTRUM AND COLOR REPRODUCTION SYSTEM TO CONVERT A COLOR SIGNAL FROM A COLOR-IMAGE INPUT INTO A COLOR SIGNAL FOR A COLOR-IMAGE OUTPUT

This application is a U.S. National Phase Application under 35 USC 371 of International Application PCT/JP02/10935 filed Oct. 22, 2002.

TECHNICAL FIELD

The present invention relates to a spectrum and color reproduction system. More particularly, the present invention relates to a spectrum and color reproduction system using a spectral reflectance or spectral space as a space for connecting color reproduction information.

BACKGROUND ART

In recent years, the widespread of color image apparatuses such as a digital camera, a scanner, a printer, and a display increases the chance for handling a color image by general people.

Conventionally, a specialist for color adjustment performs the image processing by an experimental technology in a closed system. Unlike the conventional image processing, the accurate use of a color image in an open system by the general people needs the color reproduction information having a common format or interface which defines the color reproduction property of an input/output device and a system for color conversion using the color reproduction information.

ICC (International Color Consortium) proposes Color Profile (hereinafter, referred to as an ICC profile) as the color reproduction information so as to realize a system for accurately managing and reproducing the color in the open system. The specification of the ICC profile is described in Specification ICC. 1: 1998-09 (document 1) (refer to http://www.color.org).

The ICC profile uses an XYZ or LAB color space prescribed by Commission Internationale de l'Eclairage (CIE) as an interface, namely, Profile Connection Space (PCS), and realizes the accurate transmission of the color information by signal processing via the PCS between different apparatuses.

The XYZ or LAB color space used as the PCS is embodied only under the observation environment of D50 illumination light prescribed by the CIE. The use of the XYZ or LAB color space under the restricted observation environment defines the PCS as a value indicating the color appearance.

A large part of the currently-widespread color image apparatuses and color reproduction systems use three primary colors. The specification of the ICC profile is basically prescribed based on the three primary colors, and the three-dimensional color space is used as the PCS, so as to transmit and reproduce three-dimensional color information.

On the other hand, the research and development advances into a multi-band camera for inputting an image by the number of bands not less than four bands, a multi-primary-color display device having four or more primary colors, and a multi-color printer.

In the color estimation using the multi-band camera, not only the color of a subject is accurately estimated but also the spectrum is accurately estimated. Thus, the color is estimated under arbitrary illumination light.

The color estimation from a photographing signal by using the multi-band camera is disclosed in the article "Development of color imaging system for accurate color reproduction" written by Yuri MURAKAMI et al. (on pages 5 to 8 of the collected papers "Color Forum JAPAN '99") (document 2).

The multi-primary-color display is disclosed in "Six-Primary Color Projection Display for Expanded Color Gamut Reproduction" written by T. Ajito et al. (on pages 135 to 138 in Proc. Int. Symp. on Multispectral Imaging and Color Reproduction for Digital Archives, Chiba University, Japan, 1999) (document 3), in which the color area for reproduction is expanded. Furthermore, as disclosed in "Aspects of total multispectral image reproduction systems" written by B. Hill (on pages 67 to 78 in Proceedings of Second International Symposium on Multispectral Imaging and High Accurate Color Reproduction) (document 4), the multi-primary-color display can accurately reproduce the color for many people in views of the individual differences of perceiving a color matching function.

In addition, the multi-color printer is disclosed in "Spectral Color Reproduction for Hardcopy System by using Vector Error Diffusion Method" written by M. Kouzaki et al. (on pages 106 to 109 in Proceedings of Second International Symposium on Multispectral Imaging and High Accurate Color Reproduction) (document 5), in which a technology is described for reproducing the spectral reflectance by the hardcopy, thereby reproducing the same spectrum and color as those of the actual subject under arbitrary observation illumination-light.

As mentioned above, individual research reports exist with respect to the color reproduction technology via the spectral space using color-image input means or color-image output means such as multi-band input, the multi-primary-color display, and multi-color printing. However, a profile for prescribing the spectrum information necessary for color reproduction and means for realizing the color reproduction via the spectral space as an open system using the profile such as the color reproduction system using the ICC profile, has not been proposed.

Further, in these systems, a technology for spectral space expressed by the number of dimensions including the current three-dimensional color space and a system having compatibility with the current system are requested.

The present invention is devised in view of the above circumstances and it is one object of the present invention to provide a spectrum and color reproduction system capable of accurately reproducing the spectrum or color of the color image inputted by the color-image input means.

Further, it is another object of the present invention to provide a spectrum and color reproduction system which enables the compatibility with the current color reproduction system via the three-primary-color space.

DISCLOSURE OF INVENTION

According to a first invention, a spectrum and color reproduction system comprises: color-image input means; color-image output means; and color converting means which converts a color signal for the color-image input means into a color signal for the color-image output means by using a color reproduction property of the color-image input means and a color reproduction property of the color-image output means, wherein the color reproduction property of the color-image input means and the color reproduction property of the color-image output means comprise information having a corresponding relationship between the color signals and one of a spectrum and a spectral reflectance.

According to a second invention, in the spectrum and color reproduction system according to the first invention, the color converting means converts the color signal for the color-image input means into the color signal for the color-image output means by using a color spatial converting property having at least one of a color matching function and an illumination-light spectrum which prescribes a reflection spectrum for the spectral reflectance.

According to a third invention, in the spectrum and color reproduction system according to the second invention, the color converting means comprises processing selecting means which selects a color converting method based on the number of sets of color matching functions comprised in the color spatial converting property.

According to a fourth invention, in the spectrum and color reproduction system according to any one of the first to third inventions, the color reproduction property of the color-image input means and the color reproduction property of the color-image output means comprise information having a corresponding relationship between the respective color signal and any of an arbitrary spectral reflectance, spectrum, and colorimetric value.

According to a fifth invention, in the spectrum and color reproduction system according to the fourth invention, the color converting means comprises processing selecting means which selects a color converting method based on which corresponding relationship between a signal value and any of the arbitrary spectral reflectance, spectrum, and colorimetric value is supplied by the color reproduction property.

BEST MODE FOR CARRYING OUT THE INVENTION

Hereinbelow, a description is given of embodiments of the present invention with reference to the drawings.

Figure 1:
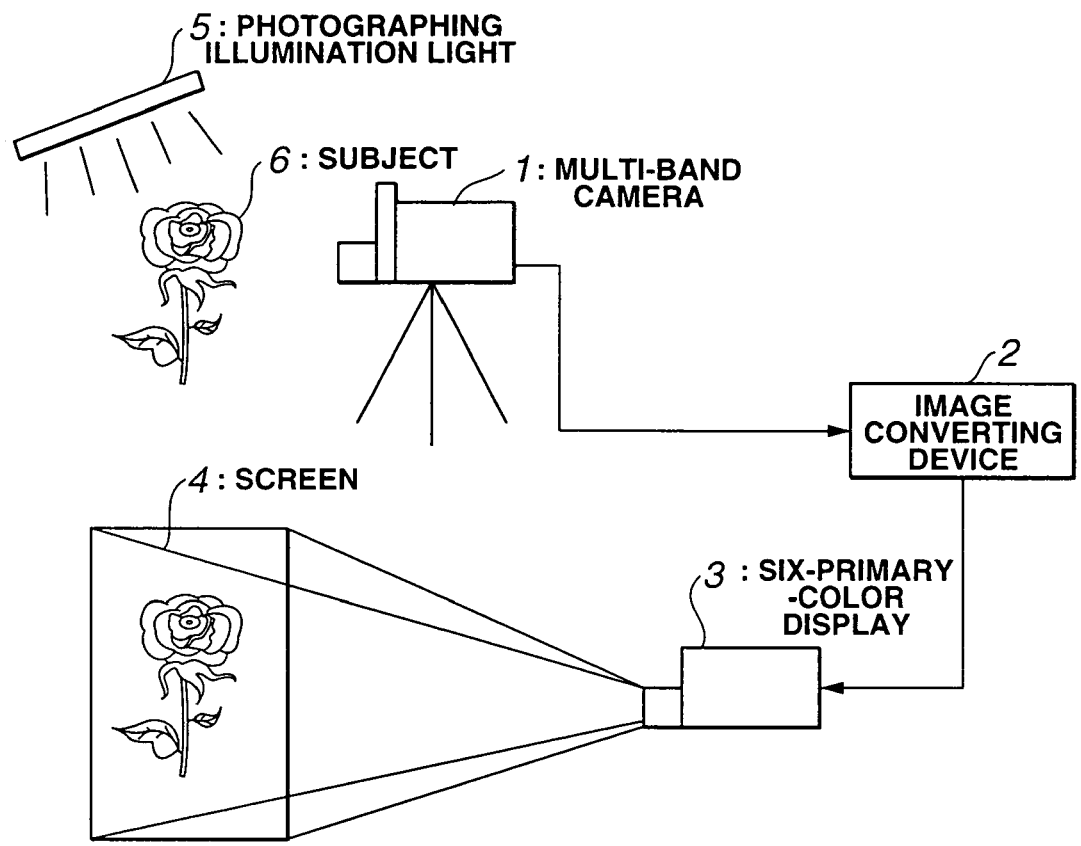
FIG. 1 is a block diagram showing the schematic structure of a spectrum and color reproduction system according to a first embodiment of the present invention.

FIGS. 1 to 14 show the first embodiment of the present invention, and FIG. 1 is a block diagram showing the schematic structure of a spectrum and color reproduction system.

According to the first embodiment, the spectrum and color reproduction system comprises: a multi-band camera 1 as color-image input means which photographs an image of a subject 6 illuminated with a photographing illumination light 5; an image converting device 2 as color converting means which converts a color image inputted from the multi-band camera 1 into a color image for output to a six-primary-color display 3 which will be described later; and the six-primary-color display 3 as color-image output means which projects the color image converted by the image converting device 2 to a screen 4.

The multi-band camera 1 photographs the subject 6 illuminated with the photographing illumination light 5 as multi-band image data having 16 bands, and outputs the photographed image data to the image converting device 2.

The image converting device 2 converts the image data having the 16 bands inputted from the multi-band camera 1 into six-primary-color image data necessary for displaying on the six-primary-color display 3, and outputs the image data after conversion to the six-primary-color display 3, which will be described later.

The six-primary-color display 3 projects the six-primary-color image data inputted from the image converting device 2 to the screen 4, thereby displaying the image for the observation.

Figure 2:
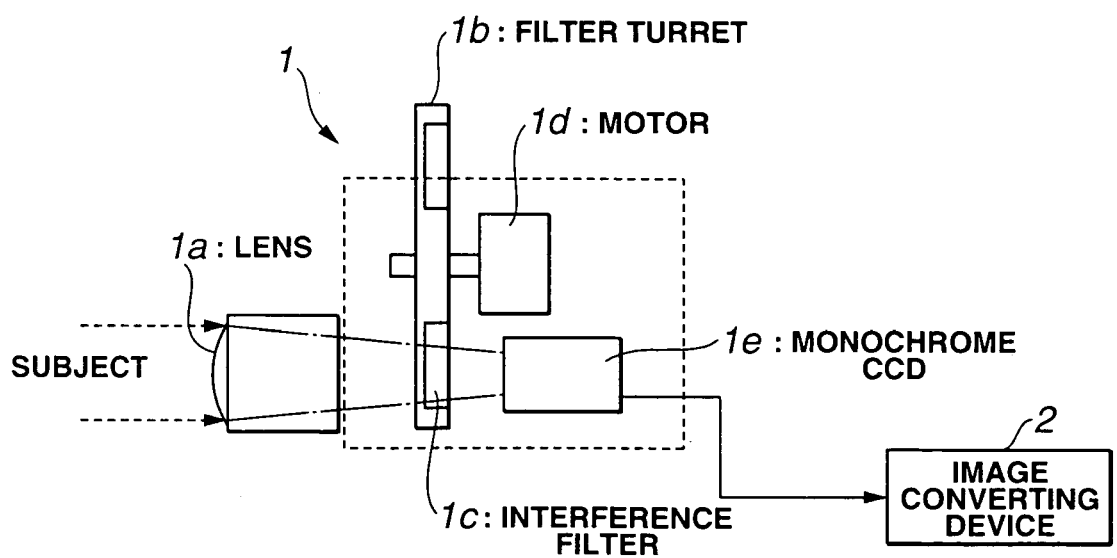
FIG. 2 is a diagram showing the structure of a multi-band camera according to the first embodiment.

FIG. 2 is a diagram showing the structure of the multi-band camera 1.

Input light from the subject 6 is converged by a lens 1a and, therefrom, only light having a predetermined wavelength band passes through an interference filter 1c. Then, the passage light image is formed to a monochrome CCD 1e.

The number of the interference filters 1c is 16 in accordance with the 16 bands, and the 16 interference filters 1c are mounted on a filter turret 1b. The filter turret 1b is rotated by a motor 1d, thereby sequentially inserting the interference filters 1c in the light passage from the lens 1a the monochrome CCD 1e. Synchronously with the positioning of the interference filters 1c on the light passage, the monochrome CCD 1e photographs the image, thereby sequentially photographing a subject image having the 16 bands with the spectral sensitivity corresponding to the interference filter 1c.

Figure 3:
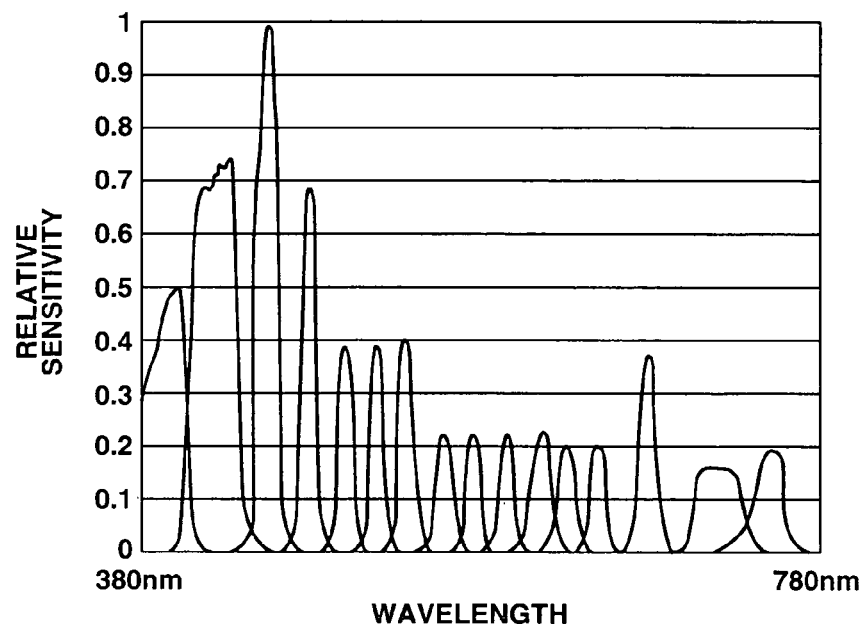
FIG. 3 is a diagram showing one example of the spectral sensitivity of the multi-band camera having 16 bands according to the first embodiment.

FIG. 3 is a diagram showing one example of the spectral sensitivity of the multi-band camera 1 having the 16 bands.

Referring to FIG. 3, the multi-band camera 1 has the spectral sensitivity having 16 peak sensitivities at an equal interval in a wavelength region ranged from 380 nm to 780 nm. Multi-band image data having the 16 bands photographed by the multi-band camera 1 is outputted and is processed by the image converting device 2.

By changing the interference filters 1c of the filter turret 1b, the spectral sensitivity of the 16 bands can be changed in accordance with the application.

Figure 4:
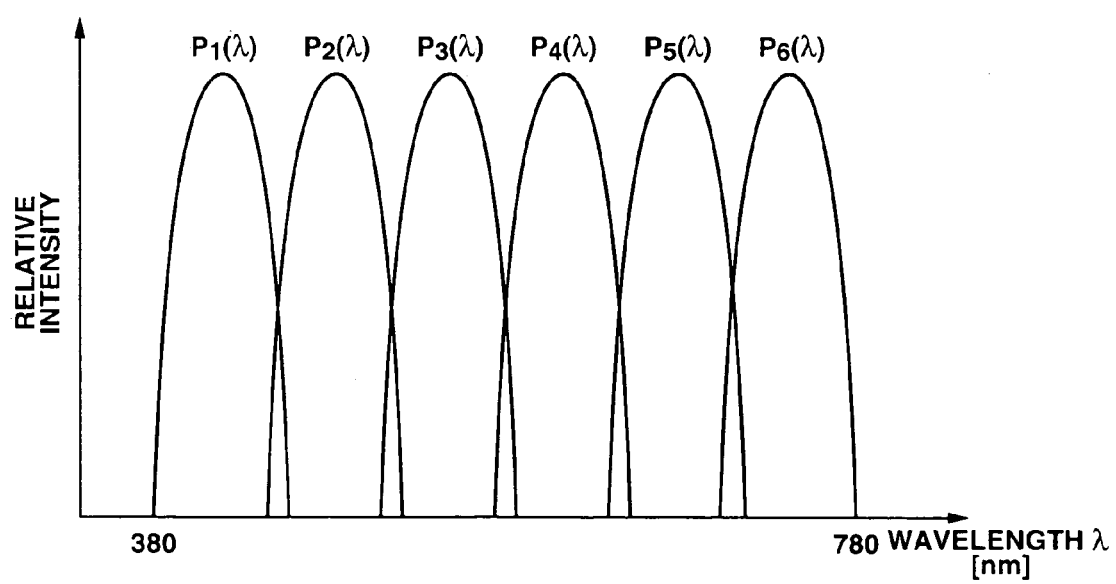
FIG. 4 is a diagram showing a light-emission spectrum having six primary colors of a six-primary-color display according to the first embodiment.

FIG. 4 is a diagram showing a light-emission spectrum having the six primary colors of the six-primary-color display 3.

Six-primary-color light-emission spectrum $p_1(\lambda)$, $p_2(\lambda)$ $p_3(\lambda)$, $p_4(\lambda)$, $p_5(\lambda)$, and $p_6(\lambda)$ are distributed at equal intervals in the wavelength area from 380 nm to 780 nm.

Figure 5:
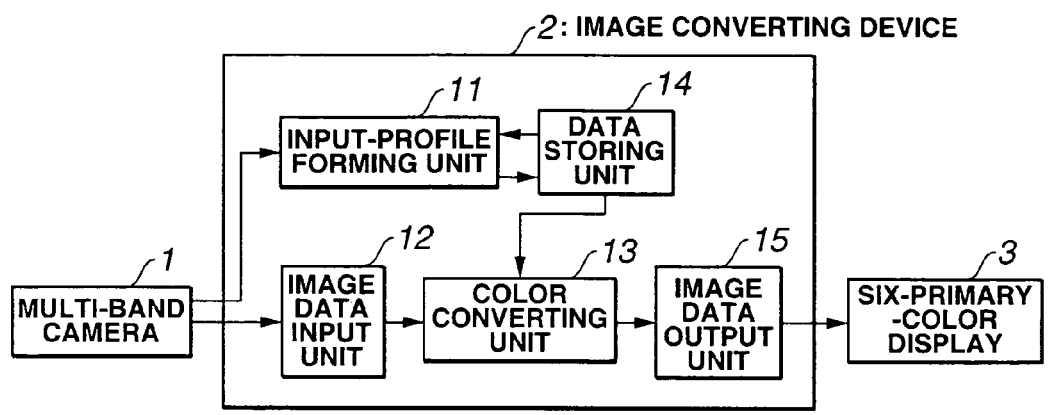
FIG. 5 is a block diagram showing the structure of an image converting device according to the first embodiment.

FIG. 5 is a block diagram showing the structure of the image converting device 2.

The image converting device 2 comprises: an input-profile forming unit 11; an image-data input unit 12; a color converting unit 13; a data storing unit 14; and an image-data output unit 15.

The input-profile forming unit 11 forms an input profile based on camera setting information inputted from the multi-band camera 1 and data inputted from the data storing unit 14.

That is, the input-profile forming unit 11 inputs an exposure time and a stop value upon photographing for every band of the camera, as the camera setting information, from the multi-band camera 1.

The input-profile forming unit 11 inputs, from the data storing unit 14, the spectral sensitivity of each band of the camera, the gradation property of each band, the photographing illumination-light spectrum, and statistic data of a subject spectral reflectance, when the reference exposure time and the reference stop value are previously measured.

The spectral sensitivity of the camera and the spectrum data such as the photographing illumination-light spectrum, and the statistic data of the subject spectral reflectance, which are used by the image converting device 2, have 401 pieces of data at intervals of 1 nm within the range of 380 nm to 780 nm.

The input-profile forming unit 11 calculates a spectral sensitivity $h_j(\lambda)$ upon photographing, based on a spectral sensitivity $h_{0j}(\lambda)$ of a band j (j=1 to 16) of the camera at the reference time exposure and at the reference stop value, the stop value $K_{ij}$ upon photographing, and the time exposure $K_{ej}$ upon photographing by the following expression 1.

$$h_j(\lambda) = \frac{k_{ej}}{k_{ij}^2} \cdot h_{0j}(\lambda) \quad (j = 1 \text{ to } 16) \qquad \text{[Expression 1]}$$

Further, the input-profile forming unit 11 converts, into data in a predetermined tag format, the spectral sensitivity $h_j(\lambda)$ calculated by the expression 1 upon photographing, the photographing illumination-light spectrum, and the statistic data of the subject spectral reflectance, and records the converted data as the input profile to the data storing unit 14. The detail of the input profile will be described later together with the description of another profile.

Next, the image-data input unit 12 stores 16-band image data as a color signal inputted from the multi-band camera 1, and outputs a 16-band photographing signal at every pixel position to the color converting unit 13.

The color converting unit 13 inputs, from the data storing unit 14, the input profile as the color reproduction property of the color-image input means, a color spatial converting profile, and a display profile as the color reproduction property of the color-image output means, converts the 16-band photographing signal inputted from the image-data input unit 12 by using the data, and outputs the converted data to the image-data output unit 15.

The image-data output unit 15 stores a 6-primary-color display signal as the color signal inputted from the color converting unit 13, and outputs 6-primary-color image data to the six-primary-color display 3.

Figure 6:
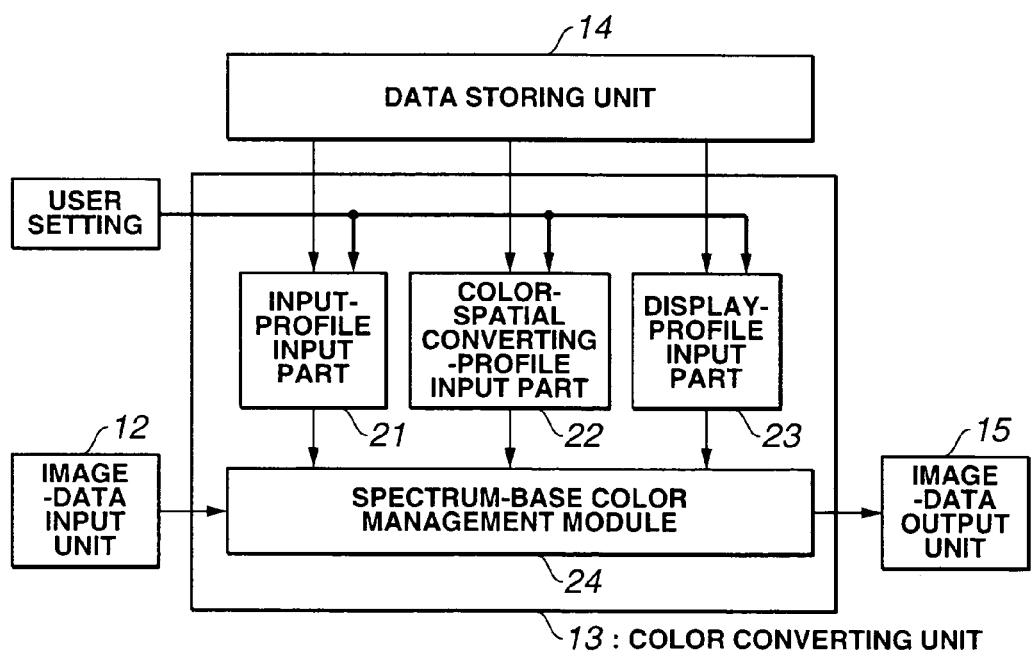
FIG. 6 is a block diagram showing the structure of a color converting unit according to the first embodiment.

FIG. 6 is a block diagram showing the structure of the color converting unit 13.

The color converting unit 13 comprises: an input-profile input part 21; a color-spatial converting-profile input part 22;

a display-profile input part 23; and a spectrum-base color management module (hereinafter, referred to as a spectrum-base CMM) 24.

The input-profile input part 21, the color-spatial converting-profile input part 22, and the display-profile input part 23 input, from the data storing unit 14 in accordance with the user setting, the input profile, the color spatial converting profile, and the display profile, respectively, and output data in the profiles to the spectrum-base CMM 24.

The spectrum-base CMM 24 converts the 16-band photographing signal inputted from the image-data input unit 12 into the 6-primary-color display signal, by using the data in the profiles inputted from the input-profile input part 21, the color-spatial converting-profile input part 22, and the display-profile input part 23, and outputs the 6-primary-color display signal after the conversion to the image-data output unit 15.

Figure 7:
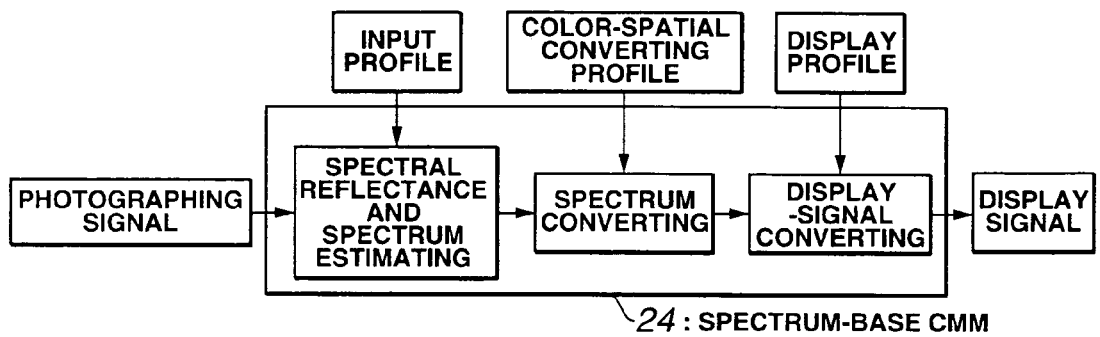
FIG. 7 is a diagram showing the concept for converting a photographing signal into a display signal by using a spectrum-base CMM according to the first embodiment.

FIG. 7 is a diagram showing the concept for converting the photographing signal into the display signal by using the spectrum-base CMM 24.

The input profile comprises information on a relationship between the photographing signal and the subject spectral reflectance when the subject is a reflecting material, and information on a relationship between the photographing signal and the subject spectrum when the subject is a light-emission material. The spectrum-base CMM 24 converts the photographing signal into the subject spectral reflectance or the subject spectrum by using the input profile.

The display profile comprises information on a relationship between the display spectrum and the display signal, and the spectrum-base CMM 24 can converts the display spectrum into the display signal by using the display profile.

The color-spatial converting profile comprises a rendering illumination-light spectrum used for calculating the subject spectrum for the subject spectral reflectance and further a color matching function indicating the color perception property of the human being if necessary. The spectrum-base CMM 24 calculates the subject spectrum under the predetermined illumination light for the subject spectral reflectance by using the color-spatial converting profile, and if necessary converts the subject spectrum into the display spectrum in view of the color perception property of the human being.

As mentioned above, in the spectrum-base CMM 24, device profiles such as the input profile and the display profile indicate a corresponding relationship between the signal value and the spectral reflectance and spectrum, and the spectral reflectance and the spectral space become an interface between the profiles, namely, a profile connection space (PCS).

Information on the rendering illumination-light spectrum and the color matching function for determining the color from the spectral reflectance and spectrum is provided by the color-spatial converting profile. The conversion from the spectrum information indicating the physical amount to the color information indicating the psychological amount can be set independently of the device profiles.

The processing sequence of the spectrum-base CMM 24 is not necessarily limited to the one shown in FIG. 7 and, preferably, the proper processing structure is formed such that the calculating processings are combined in accordance with an input/output condition.

Figure 8:
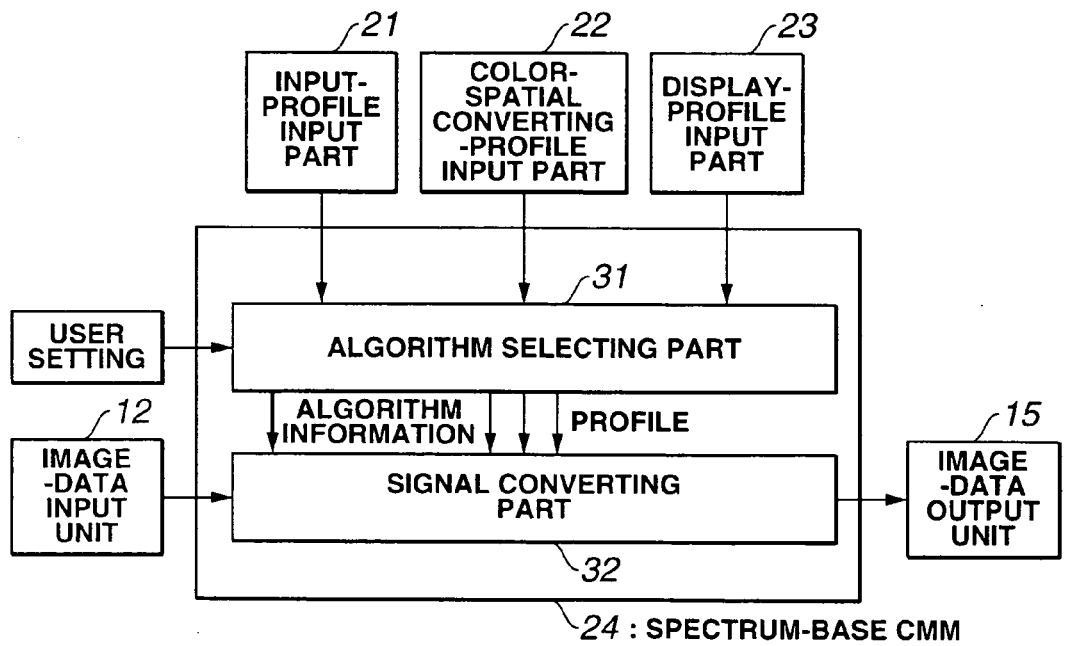
FIG. 8 is a block diagram showing the structure of the spectrum-base CMM according to the first embodiment.

FIG. 8 is a block diagram showing the structure of the spectrum-base CMM 24.

The spectrum-base CMM 24 comprises an algorithm selecting part 31 as processing selecting means and a signal converting part 32.

The algorithm selecting part 31 selects a color conversion algorithm used by the signal converting part 32, based on a user setting and the profile data inputted from the input-profile input part 21, the color-spatial converting-profile input part 22, and the display-profile input part 23.

The user setting comprises a setting for selecting any of the spectrum matching and the calorimetric matching, and the user of the image converting device 2 selects one of the matchings upon the color conversion.

When the spectrum matching is selected in the user setting, the algorithm selecting part 31 determines whether or not the color matching function is comprised, as data, in the color-spatial converting profile inputted from the color-spatial converting-profile input part 22.

When the color-spatial converting profile does not comprise the color matching function as the data, the algorithm selecting part 31 outputs algorithm information necessary for using a 1st-model signal processing section 42 (refer to FIG. 9) to the signal converting part 32.

When the color-spatial converting profile comprises the color matching function as the data, the algorithm selecting part 31 outputs the algorithm information necessary for using a 2nd-model signal processing section 43 (refer to FIG. 9) to the signal converting part 32.

When the matching of the colorimetric value is selected in the user setting, the algorithm selecting part 31 inputs the number of sets of color matching functions comprised in the color-spatial converting profile inputted from the color-spatial converting-profile input part 22.

When the number of sets of color matching functions is one, the algorithm selecting part 31 outputs the algorithm information necessary for using a 3rd-model signal processing section 44 (refer to FIG. 9) to the signal converting part 32.

When the number of sets of color matching functions is two or more, the algorithm selecting part 31 outputs the algorithm information necessary for using a 4th-model signal processing section 45 (refer to FIG. 9) to the signal converting part 32.

Then, the algorithm selecting part 31 outputs, to the signal converting part 32, the selected algorithm information, the input profile, the color-spatial converting profile, and the display profile.

The signal converting part 32 converts, into the 6-primary-color display signal, the 16-band photographing signal inputted from the image-data input unit 12 by using the input profile, the color-spatial converting profile, and the display profile in accordance with one of converting methods (the 1st-to-4th-model signal processing sections 42 to 45) selected based on the algorithm information inputted from the algorithm selecting part 31, and outputs the 6-primary-color display signal after the conversion to the image-data output unit 15.

Figure 9:
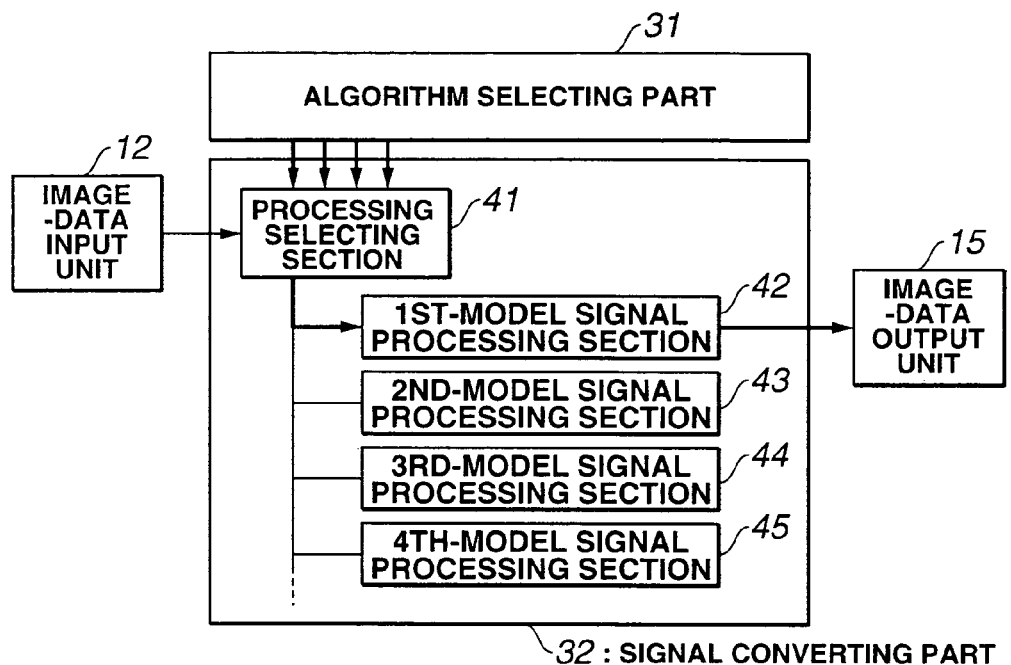
FIG. 9 is a block diagram showing the structure of a signal converting part according to the first embodiment.

FIG. 9 is a block diagram showing the structure of the signal converting part 32.

The signal converting part 32 comprises a processing selecting section 41 and four model-signal-processing-sections, that is, the 1st-model signal processing section 42, the 2nd-model signal processing section 43, the 3rd-model signal processing section 44, and the 4th-model signal processing section 45.

The processing selecting section 41 selects the model signal processing section for performing the processing based on the algorithm information inputted from the algorithm selecting part 31, and outputs, to the selected model-signal-processing-section, the input profile, the color-spatial converting profile, and the display profile which are inputted from the algorithm selecting part 31 and the 16-band photographing signal inputted from the image-data input unit 12.

The each model signal processing section inputs, from the processing selecting section 41, the input profile, the color-spatial converting profile, the display profile, and the 16-band photographing signal, converts the 16-band photographing signal into the 6-primary-color display signal, and outputs the signal after the conversion to the image-data output unit 15.

Figure 10:
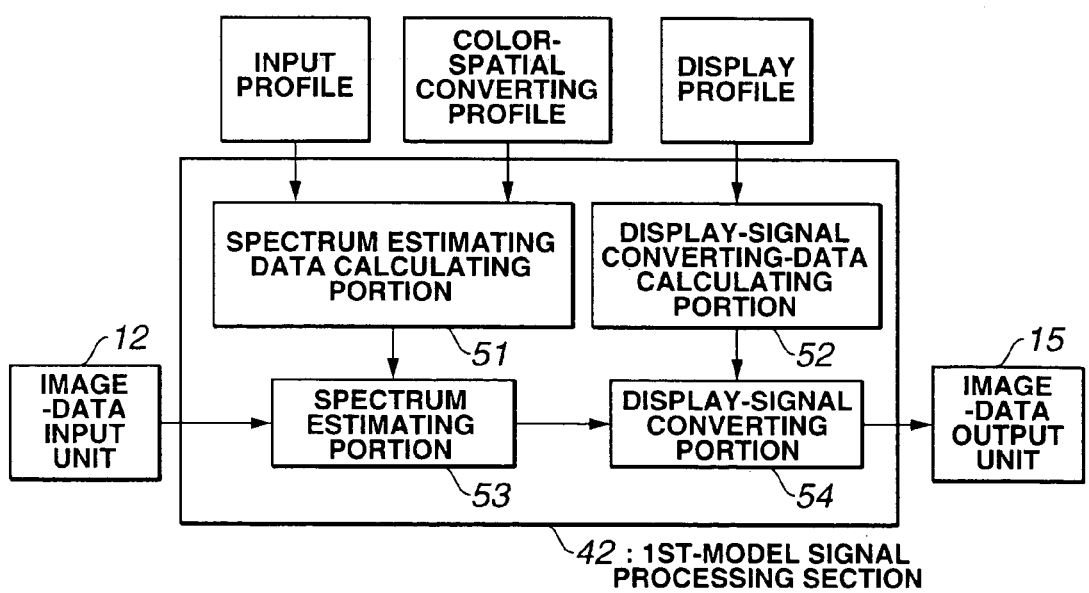
FIG. 10 is a block diagram showing the structure of a 1st-model signal processing section using a spectrum least-square according to the first embodiment.

FIG. 10 is a block diagram showing the structure of the 1st-model signal processing section 42.

The 1st-model signal processing section 42 comprises a spectrum estimating data calculating portion 51, a display-signal converting-data calculating portion 52, a spectrum estimating portion 53, and a display-signal converting portion 54.

The spectrum estimating data calculating portion 51 calculates a spectrum estimating matrix and gradation correcting data by using the camera spectral sensitivity, the photographing illumination-light spectrum, the statistic data of the subject spectral reflectance, the gradation property, which are comprised in the input profile, and the rendering illumination-light spectrum comprised in the inputted color-spatial converting profile; and outputs the calculated data to the spectrum estimating portion 53.

The rendering illumination-light spectrum is an illumination-light spectrum which is set to reproduce the color of the subject, and can be set independently of the photographing illumination-light or the observation illumination-light spectrum.

The above-mentioned document 2 discloses means for calculating a spectral-reflectance estimating matrix from the photographing signal by using the camera spectral sensitivity, the photographing illumination-light spectrum, and the statistic data of the subject spectral reflectance. The calculation of spectrum estimating matrix is not described here because the spectral reflectance in the document 2 is replaced with (spectral reflectance×rendering illumination-light spectrum), and the similar means is used.

The spectrum estimating matrix contains (401×16) components for calculating a 401-dimensional subject spectrum from the 16-band photographing signal.

The gradation correcting data is calculated by the interoperation from the gradation property data corresponding to the TRC disclosed in the document 1, and comprises data which is obtained by correcting the 16-band photographing signal to a signal value linear to the input light strength.

The display-signal converting-data calculating-portion 52 outputs the 6-primary-color spectrum and the gradation correcting data to the display-signal converting portion 54 by using the 6-primary-color spectrum and the gradation property comprised in the inputted display profile.

The gradation correcting data corresponds to an inverse function of the TRC disclosed in the document 1, and comprises data providing the 6-primary-color display signal for the signal value linear to the luminance.

The spectrum estimating portion 53 inputs the gradation correcting data and the spectrum estimating matrix from the spectrum estimating data calculating portion 51, performs the gradation correction for the 16-band photographing signal inputted from the image-data input unit 12, estimates the spectrum by the matrix transformation, calculates the 401-dimensional subject spectrum, and outputs the data to the display-signal converting portion 54.

When the subject spectrum inputted from the spectrum estimating portion 53 is expressed by the linear sum of the 6-primary-color spectrums of the six-primary-color display 3, the display-signal converting portion 54 converts the 6-primary-color display signal so as to minimize an error between an original subject spectrum and the spectrum expressed by the linear sum. Next, the display-signal converting portion 54 corrects the gradation of the 6-primary-color signals by using the gradation correcting data, and outputs the 6-primary-color display signal after the correction to the image-data output unit 15.

Figure 11:
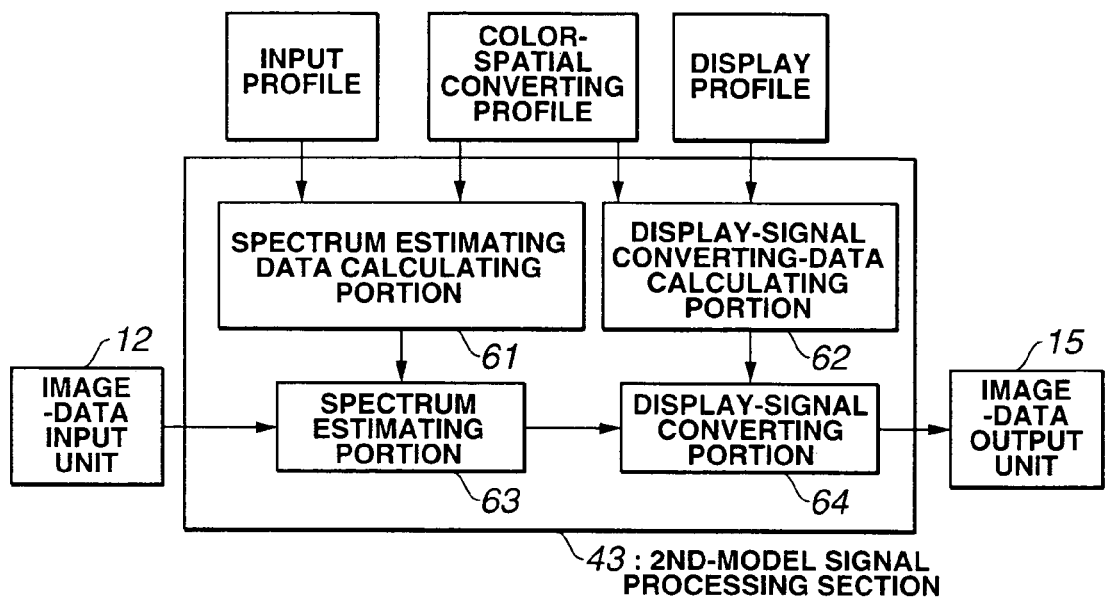
FIG. 11 is a block diagram showing the structure of a 2nd-model signal processing section using spectrum least-square with an XYZ restriction according to the first embodiment.

FIG. 11 is a block diagram showing the structure of the 2nd-model signal processing section 43.

The 2nd-model signal processing section 43 has a spectrum estimating data calculating portion 61, a display-signal converting data calculating portion 62, a spectrum estimating portion 63, and a display-signal converting portion 64.

The spectrum estimating data calculating portion 61 and the spectrum estimating portion 63 in the 2nd-model signal processing section 43 are not described because they are the same as the spectrum estimating data calculating portion 51 and the spectrum estimating portion 53 in the 1st-model signal processing section 42.

The display-signal converting data calculating portion 62 outputs the 6-primary-color spectrums, 6-primary-color colorimetric values, and the gradation correcting data to the display-signal converting section 64 by using the 6-primary-color spectrums and the gradation property comprised in the inputted display profile and the color matching function comprised in the inputted color-spatial converting profile.

Under a restriction that the calorimetric values of the subject are correctly displayed, the display-signal converting section 64 converts the subject spectrum inputted from the spectrum estimating portion 63 into the 6-primary-color display signals having the minimum error of the spectrums when the subject spectrum is expressed by the linear sum of the 6-primary-color spectrums of the six-primary-color display 3.

The 6-primary-color colorimetric values are expressed by the following expression 2 when the light-emission spectrums of the primary colors are defined by $p_j(\lambda)$ (j=1 to N) and the like and the color matching function is defined by $t_k(\lambda)$ (k=1 to K)

$$T_{jk} = \int_{\lambda=380}^{780} t_k(\lambda) p_j(\lambda) d\lambda \quad (j = 1 \text{ to } N, k = 1 \text{ to } K) \quad \text{[Expression 2]}$$

The color matching function $t_k(\lambda)$ (k=1 to K) can arbitrarily be set, including a CIE 1931 color matching function and a CIE 1964 color matching function (in these cases, K=3). The problem of the least square with the restriction is solved by the Lagrange's method of an undetermined coefficient. This method is described in "Color image reproduction treatise" written by Joji TAJIMA (on pages 68 to 69 in MARUZEN series 1996) (document 6).

Then, the display-signal converting section 64 corrects the gradation of the 6-primary-color signals by using the gradation correcting data, and outputs the corrected signals to the image-data output unit 15.

Figure 12:
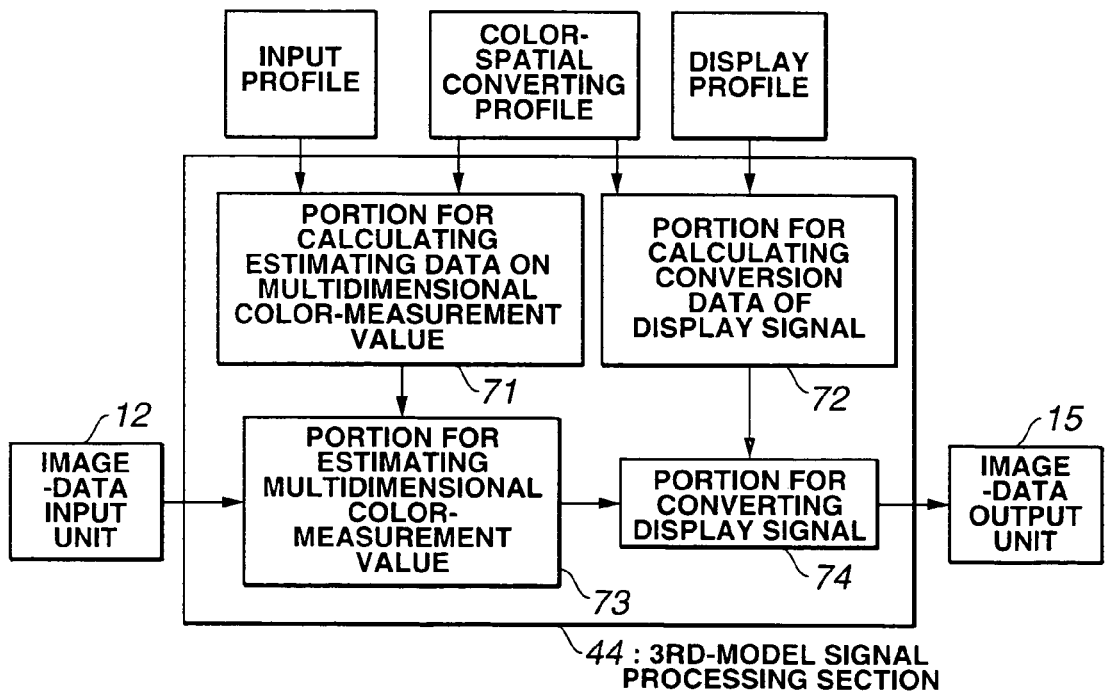
FIG. 12 is a block diagram showing the structure of a 3rd-model signal processing section using the matching of a calorimetric value according to the first embodiment.

FIG. 12 is a block diagram showing the structure of the 3rd-model signal processing section 44.

The 3rd-model signal processing section 44 has a portion 71 for calculating the estimating data on multidimensional colorimetric value, a portion 72 for calculating the conversion data of the display signal, a portion 73 for estimating the multidimensional calorimetric value, and a portion 74 for converting the display signal.

The portion 71 for calculating the estimating data on multidimensional colorimetric value calculates a multidimensional colorimetric value matrix and the gradation correcting data by using the camera spectral sensitivity, the photographing illumination-light spectrum, the subject spectral reflectance, and the gradation property, which are comprised in the inputted input profile, and the rendering illumination-light spectrum and the color matching function which are comprised in the inputted color-spatial converting profile; and outputs the calculation result to the portion 73 for estimating the multidimensional calorimetric value.

Here, the color matching function assumes to contain K ($\leqq 6$) functions, not more than the number of primary colors of the display. When (K+1) or more functions are described in the color-spatial converting profile, up to 1st to Kth functions are used.

The multidimensional calorimetric value matrix contains (K×16) components for calculating the K-dimensional calorimetric value of the subject from the 16-band photographing signal.

The document 2 describes means for calculating the spectral reflectance estimating matrix from the camera spectral sensitivity, the photographing illumination-light spectrum, and the statistic data of the subject spectral reflectance. In the case of calculating the multidimensional colorimetric value estimating matrix, a spectral reflectance f($\lambda$) in the document 2 is replaced with the following expression 3 by using a rendering illumination-light spectrum $E_R(\lambda)$.

$$T_k = \int_{\lambda=380}^{780} t_k(\lambda) E_R(\lambda) f(\lambda) d\lambda \quad (k = 1 \text{ to } K) \quad \text{[Expression 3]}$$

Thus, the same means as the one described in the document 2 is used and the description is omitted.

The portion 72 for calculating the conversion data of the display signal outputs the multidimensional colorimetric values and the gradation correcting data of the six primary colors to the portion 74 for converting the display signal, by using the 6-primary-color spectrums and the gradation property comprised in the inputted display profile and the color matching function comprised in the inputted color-spatial converting profile.

The portion 73 for estimating the multidimensional calorimetric value performs the gradation correction for the 16-band photographing signal inputted from the image-data input unit 12, by using the multidimensional calorimetric value estimating matrix and the gradation correcting data which are inputted from the portion 71 for calculating the estimating data on the multidimensional measurement-color value, converts the signals into the multidimensional calorimetric values by the matrix transformation, and outputs the converted value to the portion 74 for converting the display signal.

The portion 74 for converting the display signal converts, into the 6-primary-color display signal, multidimensional calorimetric value of the subject inputted from the portion 73 for estimating the multidimensional calorimetric value, by using the multidimensional calorimetric values of the six primary colors inputted from the portion 72 for calculating the conversion data of the display signal through the matrix transformation per area using different matrixes depending on the multidimensional calorimetric values of the subject.

The matrix transformation per area is described in "Color Conversion Method for Multiprimary Display Using Matrix Switching" written by T. Ajito et al. (on pages 191 to 197 in Optical Review Vol. 8, No. 3, 2001) (document 7), and a description thereof is omitted here.

Then, the portion 74 for converting the display signal performs the gradation correction of the six-primary-color signals by using the gradation correcting data, and outputs the correction data to the image-data output unit 15.

Figure 13:
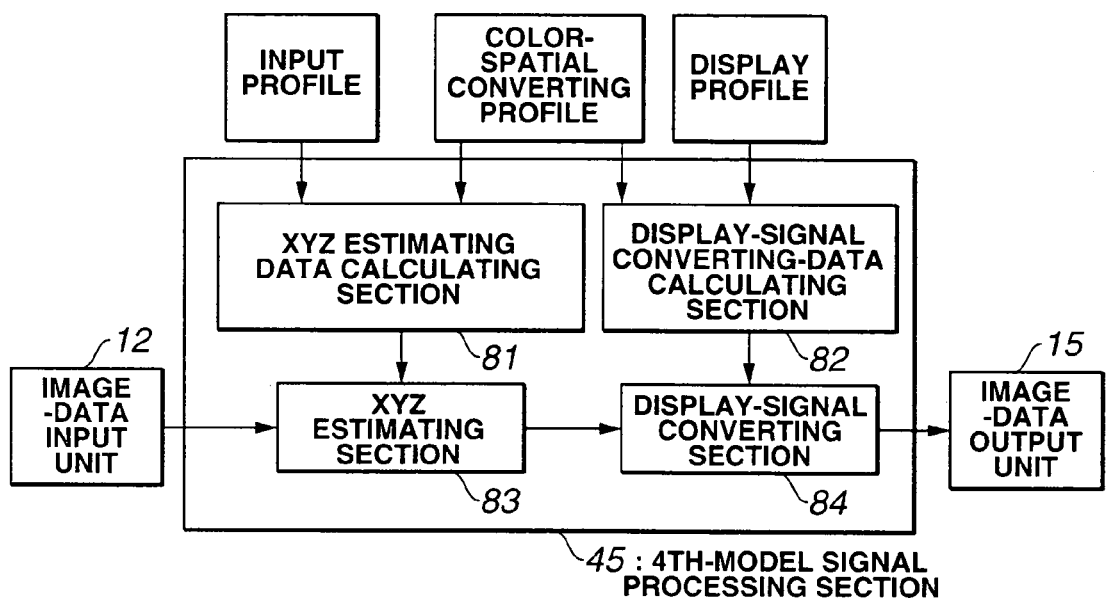
FIG. 13 is a block diagram showing the structure of a 4th-model signal processing section using the matching of a statistic calorimetric value according to the first embodiment.

FIG. 13 is a block diagram showing the structure of the 4th-model signal processing section 45.

The 4th-model signal processing section 45 has an XYZ estimating data calculating section 81, a display-signal converting-data calculating section 82, an XYZ estimating section 83, and a display-signal converting section 84.

The XYZ estimating data calculating section 81 calculates an L-XYZ estimating matrix and the gradation correcting data by using the camera spectral sensitivity, the photographing illumination-light spectrum, the subject spectral reflectance, and the gradation property, which are comprised in the inputted input profile, and the rendering illumination-light spectrum and the L-sets of XYZ color-matching functions which are comprised in the inputted color-spatial converting profile; and outputs the calculation result to the XYZ estimating section 83.

The L-XYZ estimating matrix has L matrixes having (3×16) components for calculating the XYZ of the subject from the 16-band photographing signal.

The document 2 describes means for calculating the spectral reflectance estimating matrix from the statistic data of the camera spectral sensitivity, the photographing illumination-light spectrum, and the subject spectral reflectance. In the case of calculating the L-XYZ estimating matrix, the spectral reflectance f($\lambda$) in the document 2 is replaced with the following expression 4 by using the rendering illumination-light spectrum $E_R(\lambda)$.

$$T_{kl} = \int_{\lambda=380}^{780} t_{kl}(\lambda) E_R(\lambda) f(\lambda) d\lambda \quad (k = 1 \text{ to } K, l = 1 \text{ to } L) \quad \text{[Expression 4]}$$

Thus, the same means as the one described in the document 2 is used and the description is omitted here.

The display-signal converting-data calculating section 82 outputs, to the display-signal converting section 84, the L-sets of XYZ-color spaces of the six primary colors and the gradation correcting data, by using the 6-primary-color spectrums and the gradation property which are comprised in the inputted display profile and the L-sets of XYZ-color-matching functions which are comprised in the inputted color-spatial converting profile.

The XYZ estimating section 83 corrects the gradation of the 16-band photographing signal inputted from the image-data input unit 12 by using the L-XYZ estimating matrix inputted from the XYZ estimating data calculating section 81, converts the corrected data into the L-sets of XYZ-color spaces by L-matrix transformation, and outputs the converted data to the display-signal converting section 84.

The display-signal converting section 84 converts the data into the 6-primary-color display signal so as to have the minimum value of the error between the L-sets of XYZ-color spaces of the subject inputted from the XYZ estimating section 83 and the L-sets of XYZ-color spaces of the six primary colors inputted from the display-signal converting-data calculating section 82. The color conversion using a plurality of color matching functions uses means described in the document 4.

Then, the display-signal converting section 84 performs the gradation correction of the six-primary-color signals by using the gradation correcting data, and outputs the corrected data to the image-data output unit 15.

Figure 14:
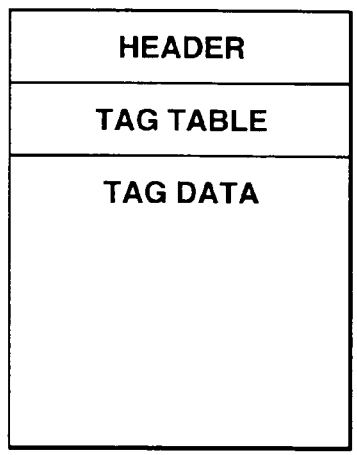
FIG. 14 is a diagram showing the basic structure of a profile according to the first embodiment.

Next, a description is given of the file format of the above-mentioned input profile, display profile, or the color converting profile with reference to FIG. 14. FIG. 14 is a diagram showing the basic structure of the profiles.

As disclosed in the above-mentioned document 1, the profiles have a tag file format. Referring to FIG. 14, the profile comprises a header having a fixed length, a tag table variable in accordance with the number of tags, and tag data.

The header has descriptions of an identifier for identifying which of the input profile, the display profile, and the color spatial converting profile the profile is and information for a PCS (profile connection space) as an interface between the profiles.

According to the first embodiment, the PCS is a 401-dimensional spectral-reflectance space which is obtained by segmenting the wavelength range of 380 to 780 nm at intervals of 1 nm. However, the PCS of the input profile is a spectral space having the same wavelength sample as that of the spectral reflectance space.

Information indicating which of the spectral reflectance space and the spectral space is the PCS is inputted to the signal processing sections 42 to 45 via the algorithm selecting part 31 and the processing selecting section 41, and is reflected in the processing of the signal processing sections 42 to 45.

When the PCS is the spectral space, the processing without using the rendering illumination-light spectrum is performed, or the rendering illumination-light spectrum is replaced with an equal energy spectrum.

The tag table comprises the number of tag data, the identifier of the tag data, the position, and the size. The tag data comprises a necessary tag which is determined in accordance with the type of the profile and an option tag which can be added in accordance with the desire of a profile former.

In the case of the input profile, the necessary tags are the spectral sensitivity, the photographing illumination-light spectrum, and the gradation property. In the case of the display profile, the necessary tags are the primary-color spectrum and the gradation property. In the case of the color spatial converting profile, the necessary tags are the rendering illumination-light spectrum.

The tag data is recorded to the position where it is described to the tag table in the profiles in accordance with a predetermined format.

According to the first embodiment, the color reproduction properties of the color-image input means and the color-image output means are provided as information to relate the signal value and the spectral reflectance and spectrum. Thus, it is possible to provide the spectrum and color reproduction system which realizes the spectrum and color reproduction having the spectral space as the interface in the open space.

The rendering illumination-light spectrum and the color matching function are set, independently of the color reproduction properties of the color-image input means and the color-image output means. By the setting, the spectrum and color reproduction is realized using the arbitrary rendering illumination-light spectrum and color matching function without changing the color reproduction properties of the color-image input means and the color-image output means.

Figure 15:
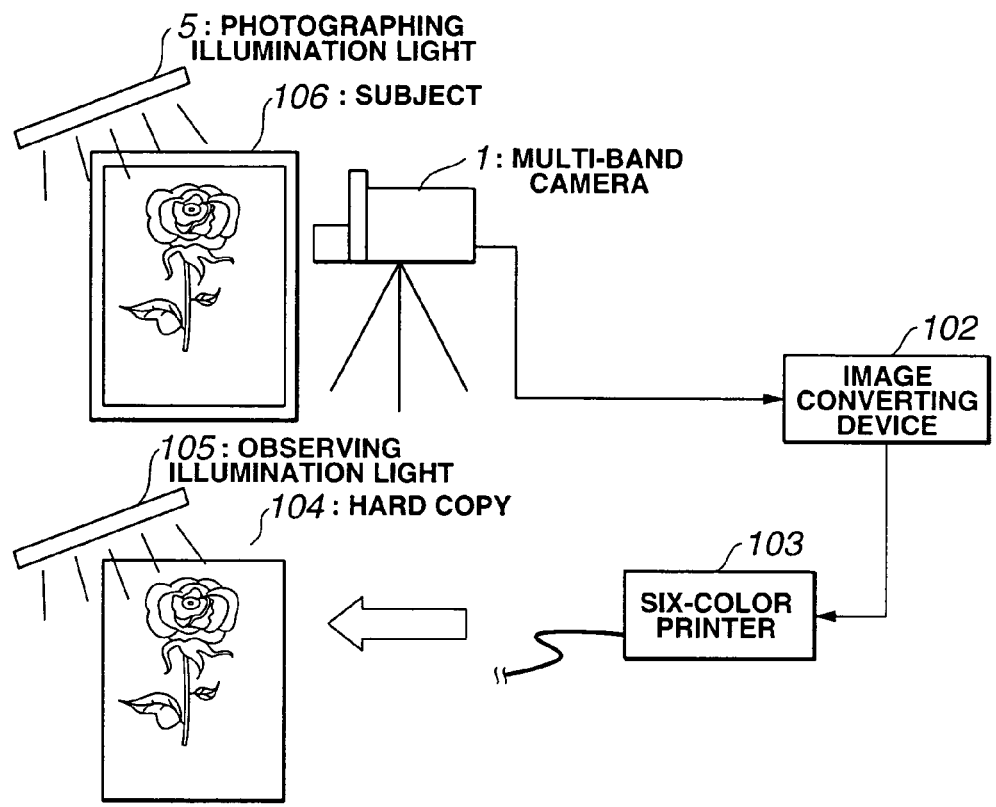
FIG. 15 is a block diagram showing the schematic structure of a spectrum and color reproduction system according to a second embodiment of the present invention.

FIGS. 15 to 22 show the second embodiment of the present invention. FIG. 15 is a block diagram showing the schematic structure of a spectrum and color reproduction system. According to the second embodiment, the same portions as those according to the first embodiment are not described and only different portions are mainly described here.

According to the second embodiment, the spectrum and color reproduction system comprises: the multi-band camera 1 which photographs a subject 106 illuminated by the photographing illumination light 5; an image converting device 102, as color converting means, which converts a color image inputted from the multi-band camera 1 into a color image for outputting to a six-color printer 103, which will be described later; and the six-color printer 103, as the color-image output means, which outputs a hard copy 104 from the color image converted by the image converting device 102. The outputted hard copy 104 is observed under an observing illumination light 105.

Thereamong, the multi-band camera 1 and the photographing illumination light 5 are the same as those according to the first embodiment.

According to the second embodiment, the subject 106 is a picture illuminated by the photographing illumination light 5 and the photographing illumination light 5 assumes to uniquely illuminate the surface of the picture.

The image converting device 102 converts 16-band image data as a color signal inputted by the multi-band camera 1 into 6-primary-color image data of the six-color printer 103, and outputs the image data as the color signal after conversion to the six-color printer 103.

The six-color printer 103 inputs the 6-primary-color image data from the image converting device 102, and prints out the image data as the hard copy 104.

The internal structure of the image converting device 102 is the same as that shown in FIG. 5 according to the first embodiment, and comprises the input-profile forming unit 11, the image-data input unit 12, the color converting unit 13, the data storing unit 14, and the image-data output unit 15.

Components other than the color converting unit 13 has the same internal structure. However, the color converting unit 13 according to the second embodiment is different from that shown in FIG. 6 according to the first embodiment and only the color converting unit 13 is described.

Referring to FIG. 5, the color converting unit 13 inputs, from the data storing unit 14, the input profile and the color spatial converting profile as the color reproduction property of the color-image input means, and the output profile as the color reproduction property of the color-image output means, converts, into the 6 color output signal, the 16-band photographing signal inputted from the image-data input unit 12 by using the above data, and outputs the image data to the image-data output unit 15.

The image-data output unit 15 stores a 6-color output signal inputted from the color converting unit 13 and outputs the signal to the six-color printer 103 according to the second embodiment.

Figure 16:
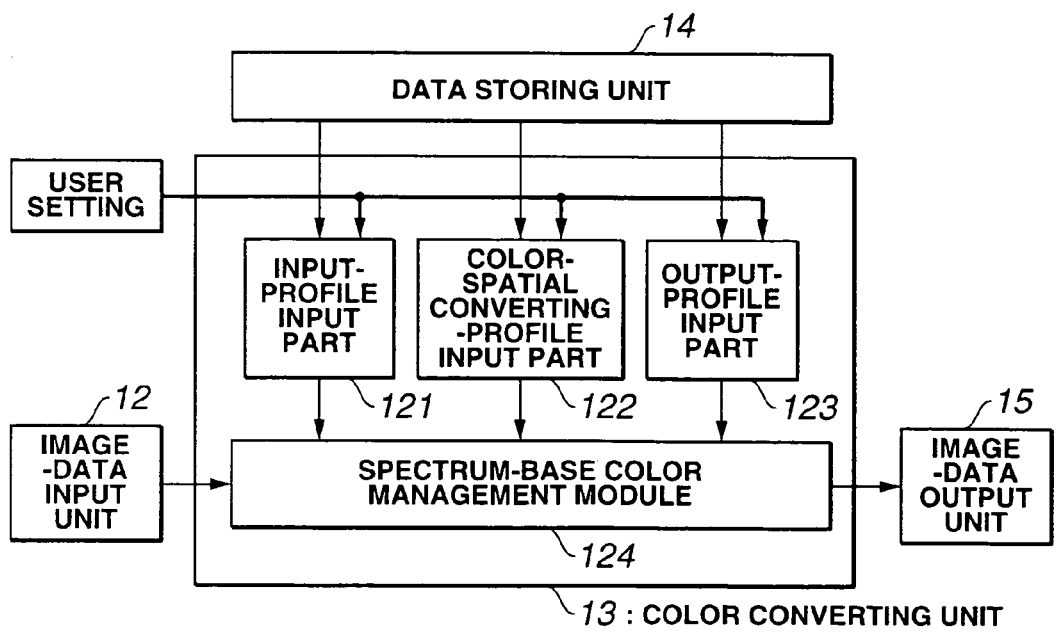
FIG. 16 is a block diagram showing the structure of a color converting unit according to the second embodiment.

FIG. 16 is a block diagram showing the structure of the color converting unit 13.

According to the second embodiment, the color converting unit 13 comprises an input-profile input part 121, a color-spatial converting-profile input part 122, an output-profile input part 123, and a spectrum-base CMM 124.

Thereamong, the input-profile input part 121 and the color-spatial converting-profile input part 122 are the same as the input-profile input part 21 and the color-spatial converting-profile input part 22 according to the first embodiment.

The output-profile input part 123 inputs the output profile from the data storing unit 14 in accordance with the user setting, and outputs the data in the output profile to the spectrum-base CMM 124.

The spectrum-base CMM 124 converts the 16-band photographing signal inputted from the image-data input unit 12 into the 6-color output signal by using the data inputted from the input-profile input part 121, the color-spatial converting-profile input part 122, and the output-profile input part 123, and outputs the converted signal to the image-data output unit 15.

The concept for converting the photographing signal into the output signal by the spectrum-base CMM 124 is the same as that shown in FIG. 7 according to the first embodiment.

The structure of the spectrum-base CMM 124 is the same as that shown in FIG. 8 according to the first embodiment, and comprises an algorithm selecting part 131 (refer to FIG. 17) corresponding to the algorithm selecting part 31 and the signal converting part 32.

The algorithm selecting part 131 selects the color spatial converting algorithm used by the signal converting part 32, based on the user setting and the profile data inputted respectively from the input-profile input part 121, the color-spatial converting-profile input part 122, and output-profile input part 123.

The user setting comprises the selecting of one of the spectral reflectance matching, the spectrum matching, and the calorimetric matching, and the user of the image converting device 102 selects any of the matchings in the color conversion.

Upon selecting the spectral reflectance matching in the user setting, the algorithm selecting part 131 outputs algorithm information necessary for using an 11th-model signal processing section 142 (refer to FIG. 17) to the signal converting part 32.

Upon selecting the spectrum matching in the user setting, the algorithm selecting part 131 determines whether or not the color matching function is comprised as data in the color spatial converting profile inputted from the color-spatial converting-profile input part 122.

When the color-spatial converting profile does not comprise the color matching function as the data, the algorithm selecting part 131 outputs the algorithm information necessary for using a 12th-model signal processing section 143 (refer to FIG. 17) to the signal converting part 32.

When the color spatial converting profile comprises the color matching function as the data, the algorithm selecting part 131 outputs the algorithm information necessary for using a 13th-model signal processing section 144 (refer to FIG. 17) to the signal converting part 32.

Further, upon selecting the colorimetric matching in the user setting, the algorithm selecting part 131 inputs the number of sets of color matching functions comprised in the color spatial converting profile inputted from the color-spatial converting-profile input part 122.

Figure 17:
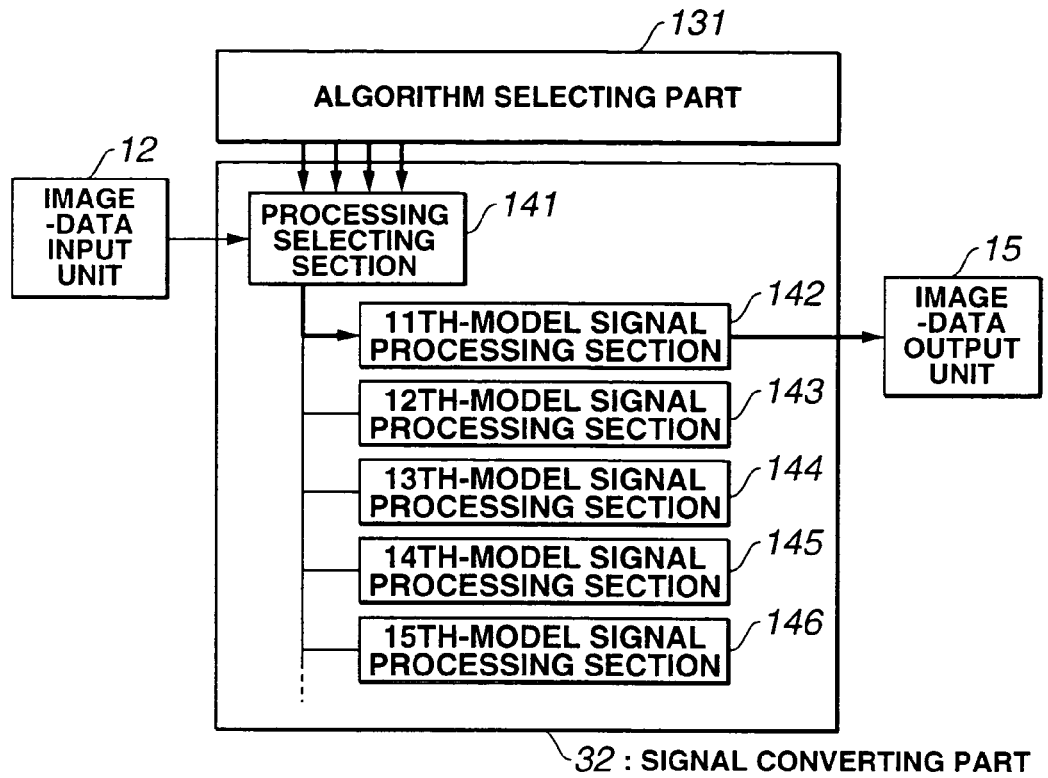
FIG. 17 is a block diagram showing the structure of a signal converting part according to the second embodiment.

When the number of sets of color matching functions is 1, the algorithm selecting part 131 outputs the algorithm information necessary for using a 14th-model signal processing section 145 (refer to FIG. 17).

When the number of sets of color matching functions is 2 or more, the algorithm selecting part 131 outputs the algorithm information necessary for using a 15th-model signal processing section 146 (refer to FIG. 17).

As mentioned above, the algorithm selecting part 131 outputs, to the signal converting part 32, the selected algorithm information, the input profile, the color spatial converting profile, and the output profile.

The signal converting part 32 converts the 16-band photographing signal inputted from the image-data input unit 12 into the six-color output signal by using the input profile, the color spatial converting profile, and the output profile, through the converting method (one of the 11th-to-15th-model signal processing sections 142 to 146) selected based on the algorithm information inputted from the algorithm selecting part. Further, the signal converting part 32 outputs the 6-color output signal after the conversion to the image-data output unit 15.

FIG. 17 is a diagram showing the structure of the signal converting part 32.

According to the second embodiment, the signal converting part 32 comprises a processing selecting section 141, and five model-signal-processing-sections of an 11th-model signal processing section 142, a 12th-model signal processing section 143, a 13th-model signal processing section 144, a 14th-model signal processing section 145, and a 15th-model signal processing section 146.

The processing selecting section 141 selects the model signal processing section for performing the processing based on the algorithm information inputted from the algorithm selecting part 131, and outputs, to the selected model signal processing section, the input profile, the color spatial converting profile, and the output profile, that are inputted from the algorithm selecting part 131, and the 16-band photographing signal that is inputted from the image-data input unit 12.

The model signal processing sections input respectively the input profile, the color spatial converting profile, and the output profile, from the processing selecting section 141, convert the 16-band photographing signal into the 6-color output signal, and output the converted signal to the image-data output unit 15.

Figure 18:
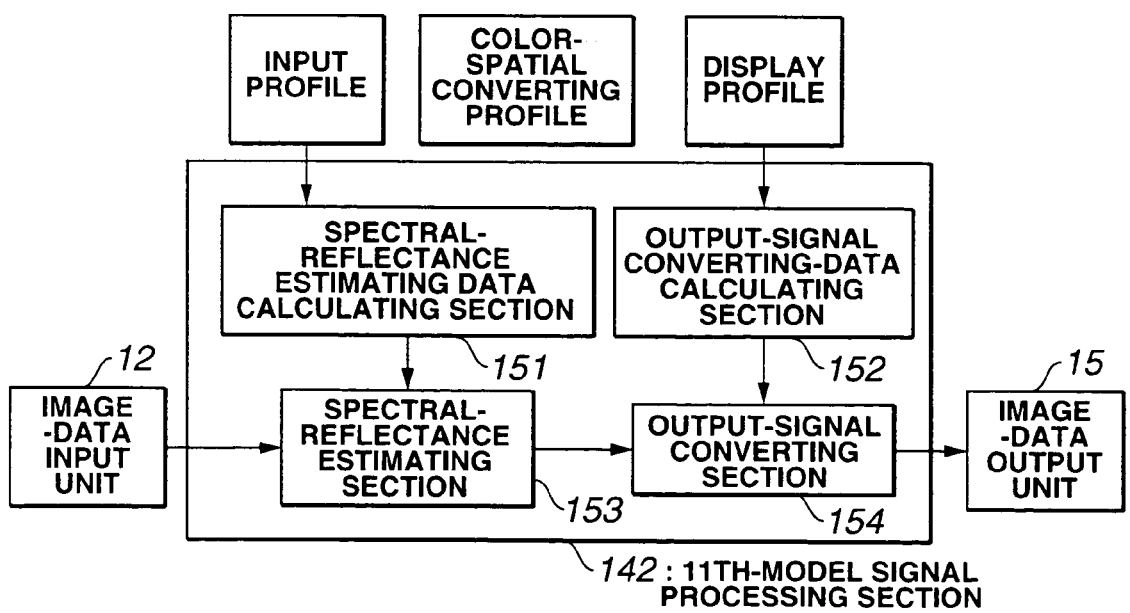
FIG. 18 is a block diagram showing the structure of an 11th-model signal processing section using the least square of a spectral reflectance according to the second embodiment.

FIG. 18 is a block diagram showing the structure of the 11th-model signal processing section 142.

The 11th-model signal processing section 142 comprises a spectral-reflectance estimating data calculating section 151, an output-signal converting-data calculating section 152, a spectral-reflectance estimating section 153, and an output-signal converting section 154.

The spectral-reflectance estimating data calculating section 151 calculates the spectral reflectance estimating matrix and the gradation correcting data by using the camera spectral sensitivity, the photographing illumination-light spectrum, the statistic data of the subject spectral reflectance, and the gradation property, which are comprised in the inputted input file, and outputs the calculation result to the spectral-reflectance estimating section 153.

The above-mentioned document 2 discloses the means for calculating the spectral reflectance estimating matrix from the camera spectral sensitivity, the photographing illumination-light spectrum, and the statistic data of the subject spectral reflectance and, therefore, the means is not described.

The spectral reflectance estimating matrix contains (401× 16) components for calculating the 401-dimensional subject spectral reflectance from the 16-band photographing signal.

The gradation correcting data is the same as the gradation correcting data described according to the first embodiment.

The spectral-reflectance estimating section 153 inputs the gradation correcting data and the spectral reflectance estimating matrix from the spectral-reflectance estimating data calculating section 151, corrects the gradation of the 16-band photographing signal inputted from the image-data input unit 12, performs the spectral-reflectance estimation by the matrix transformation, calculates 401-dimensional subject spectral reflectance, and outputs the calculation result to the output-signal converting section 154.

The output-signal converting-data calculating section 152 inputs the spectral reflectance of the 6 primary colors and an output sheet from the output profile, and outputs them to the output-signal converting section 154.

The output-signal converting section 154 converts the spectral reflectance into the 6-color output signal approximate to the spectral reflectance, upon reproducing the subject spectral reflectance inputted from the spectral-reflectance estimating section 153 by the 6 colors of the six-color printer 103. Further, the output-signal converting section 154 outputs the conversion result to the image-data output unit 15.

The above-mentioned document 5 discloses the means for converting the spectral reflectance into the 6-color output signal and, therefore, the means is not described here.

Figure 19:
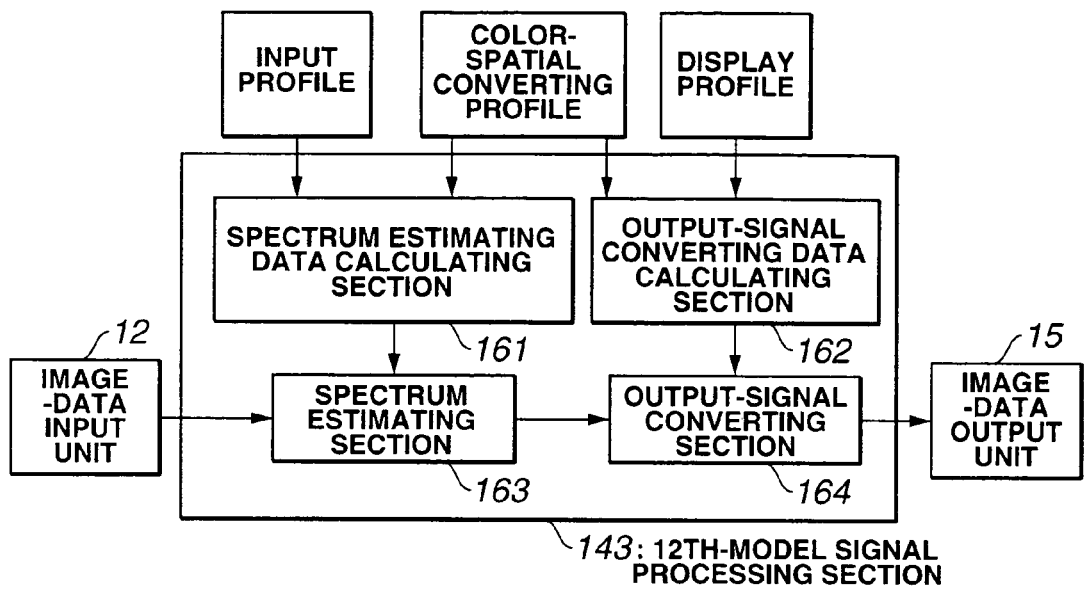
FIG. 19 is a block diagram showing the structure of a 12th-model signal processing section using the least square of the spectrum according to the second embodiment.

FIG. 19 is a block diagram showing the structure of the 12th-model signal processing section 143.

The 12th-model signal processing section 143 comprises a spectrum estimating data calculating section 161, an output-signal converting data calculating section 162, a spectrum estimating section 163, and an output-signal converting section 164.

Thereamong, the spectrum estimating data calculating section 161 and spectrum estimating section 163 are the same as the spectrum estimating data calculating portion 51 and spectrum estimating portion 53 in the 1st-model signal processing section 42 according to the first embodiment.

The output-signal converting data calculating section 162 calculates the reflecting spectrums of the 6 primary colors and the output sheet by using the spectral reflectances of the 6 primary colors and the output sheet and the rendering illumination-light spectrum comprised in the color spatial converting profile, and outputs the calculation result to the output-signal converting section 164.

The output-signal converting section 164 converts the spectrums into the 6-color output signal approximate thereto, and outputs the conversion result to the image-data output unit 15, upon reproducing the subject spectrum inputted from the spectrum estimating section 163 by the six colors of the six-color printer 103 under the rendering illumination-light.

The means for converting the 6-color output signal approximate thereto according to the second embodiment is realized in the same way as that disclosed in the above-mentioned document 5, by replacing the spectral reflectances of the 6 primary colors and the output sheet with a reflecting spectrum subjected to processing of the rendering illumination-light spectrum.

Figure 20:
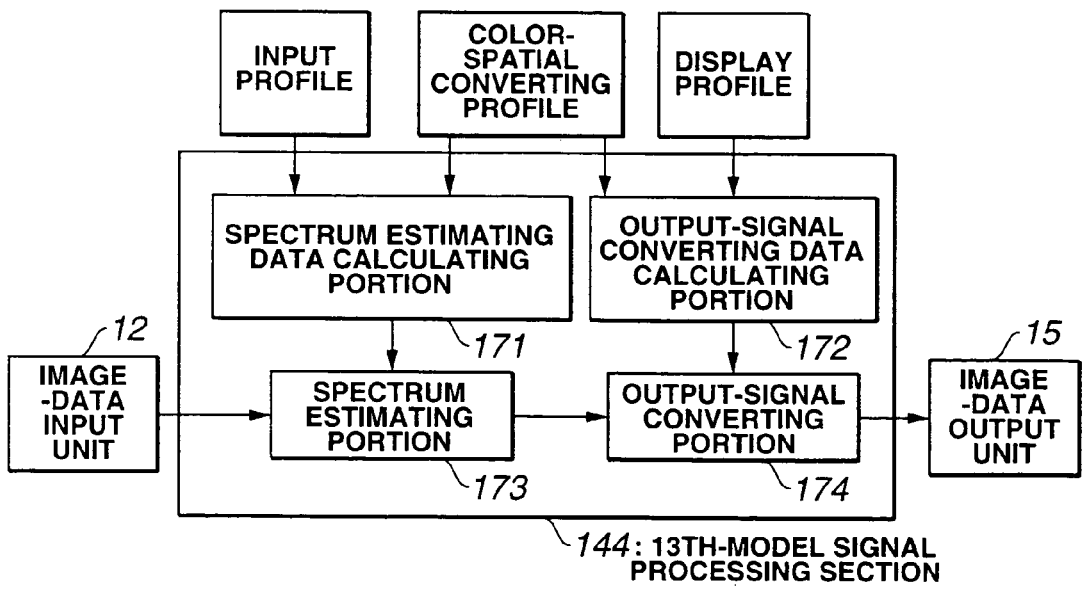
FIG. 20 is a block diagram showing the structure of a 13th-model signal processing section using the least-square of the spectrum with an XYZ restriction according to the second embodiment.

FIG. 20 is a block diagram showing the structure of the 13th-model signal processing section 144.

The 13th-model signal processing section 144 comprises a spectrum estimating data calculating portion 171, an output-signal converting data calculating portion 172, a spectrum estimating portion 173, and an output-signal converting portion 174.

Thereamong, the spectrum estimating data calculating portion 171 and the spectrum estimating portion 173 are the same as the spectrum estimating data calculating portion 61 and the spectrum estimating portion 63 in the 2nd-model signal processing section 43 according to the first embodiment.

The output-signal converting data calculating portion 172 calculates the 6 primary colors, the colorimetric values of the output sheet, and the reflecting spectrum, by using the 6 primary colors and the spectral reflectances of the output sheet which are comprised in the inputted output profile, and the rendering illumination-light spectrum and the color matching function which are comprised in the inputted color spatial converting profile, and outputs the calculation result to the output-signal converting portion 174.

The output-signal converting portion 174 converts the subject spectrum into approximate the 6-color output signal of the six-color printer 103 under the restriction for correctly displaying the calorimetric value of the subject inputted from the spectrum estimating portion 173, and outputs the conversion result to the image-data output unit 15.

The means for conversion into the 6-color output signal approximate to the spectrum under the restriction for correctly displaying the calorimetric value is realized in the same way as that disclosed in the above-mentioned document 5, by replacing the spectral reflectances of the 6 primary colors and the output sheet with the spectrum and the colorimetric value.

The calorimetric values of the 6 colors are calculated by the following expression 5 when the spectral reflectance of the primary color is designated by $p_j(\lambda)$ (j=1 to 6), the rendering illumination-light spectrum by $E_R(\lambda)$, and the color matching function by $t_k(\lambda)$ (k=1 to K).

$$T_{jk} = \int_{\lambda=380}^{780} t_k(\lambda) E_R(\lambda) p_j(\lambda) d\lambda \quad (j = 1 \text{ to } 6, k = 1 \text{ to } K) \quad \text{[Expression 5]}$$

The color matching function $t_k(\lambda)$ (k=1 to K) can arbitrarily be set, including a CIE 1931 color matching function and a CIE 1964 color matching function (in these cases, K=3).

Figure 21:
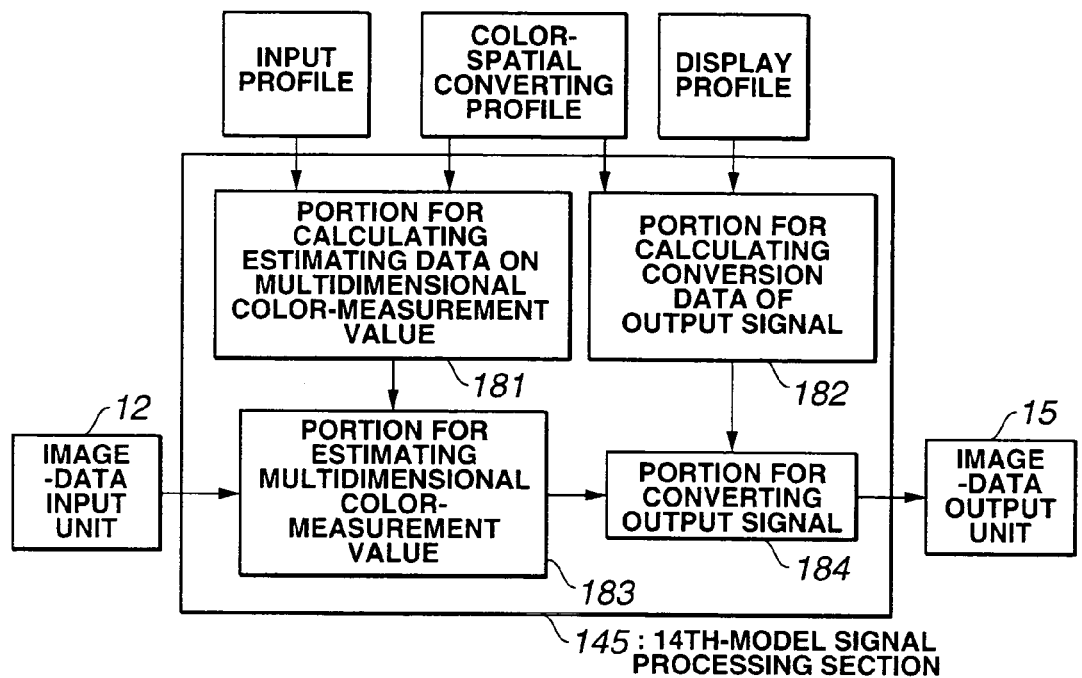
FIG. 21 is a block diagram showing the structure of a 14th-model signal processing section using the matching of the calorimetric value according to the second embodiment.

FIG. 21 is a block diagram showing the structure of the 14th-model signal processing section 145.

The 14th-model signal processing section 145 comprises a portion 181 for calculating the estimating data on the multi-dimensional calorimetric value, a portion 182 for calculating the conversion data of the output signal, a portion 183 for estimating the multidimensional calorimetric value, and a portion 184 for converting the output signal.

Thereamong, the portion 181 for calculating the estimating data on the multidimensional calorimetric value and the portion 183 for estimating the multidimensional calorimetric value are the same as the portion 71 for calculating the estimating data on multidimensional calorimetric value and the portion 73 for estimating the multidimensional colorimetric value in the 3rd-model signal processing section 44 according to the first embodiment.

The portion 182 for calculating the conversion data of the output signal calculates the calorimetric values of the 6 primary colors and the output sheet, by using the spectral reflectances of the 6 primary colors and the output sheet which are comprised in the inputted output profile and the rendering illumination-light spectrum and the color matching function which are comprised in the inputted color spatial converting profile. Further, the portion 182 for calculating the conversion data of the output signal outputs the calculation result to the portion 184 for converting the output signal.

The portion 184 for converting the output signal converts the calorimetric values of the subject inputted from the portion 183 for estimating the multidimensional colorimetric value, into the six-color output signal of the six-color printer 103 which correctly displays the colorimetric values. Further, the portion 184 for converting the output signal outputs the conversion result to the image-data output unit 15.

The above-mentioned document 5 describes the means for conversion into the six-color output signal for correctly displaying the colorimetric values and therefore this means is not described here.

Figure 22:
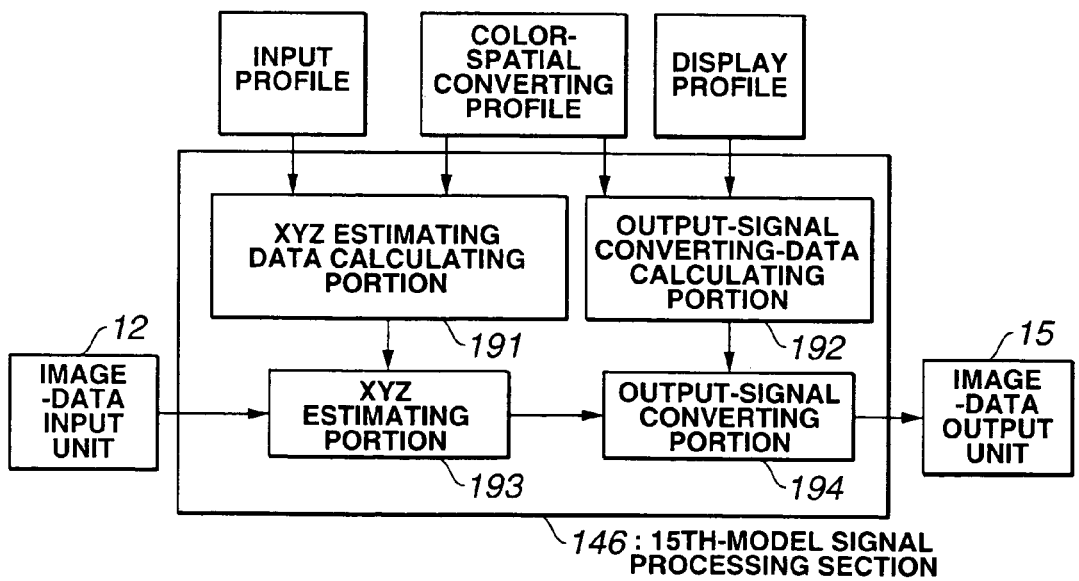
FIG. 22 is a block diagram showing the structure of a 15th-model signal processing section using the matching of a statistic calorimetric value according to the second embodiment.

FIG. 22 is a block diagram showing the structure of the 15th-model signal processing section 146.

The 15th-model signal processing section 146 comprises: an XYZ estimating data calculating portion 191; an output-signal converting-data calculating portion 192; an XYZ estimating portion 193; and an output-signal converting portion 194.

The XYZ estimating data calculating portion 191 and the XYZ estimating portion 193 are the same as the XYZ estimating data calculating portion 81 and the XYZ estimating portion 83 in the 4th-model signal processing section 45 according to the first embodiment.

The output-signal converting-data calculating portion 192 calculates the L-sets of XYZ-color spaces of the six primary colors and the output sheet by using the spectral reflectances of the six primary colors and the output sheet which are comprised in the inputted output profile and the rendering illumination-light spectrum and the L-sets of XYZ-color-matching-functions which are comprised in the inputted color spatial converting profile. Further, the output-signal converting-data calculating portion 192 outputs the calculation result to the output-signal converting portion 194.

The output-signal converting portion 194 converts the L-sets of XYZ-color spaces of the subject inputted from the XYZ estimating portion 193, into the six-color output signal of the six-color printer 103 having a minimum error from the L-sets of XYZ-color spaces. Further, the output-signal converting portion 194 outputs the conversion result to the image-data output unit 15.

The means for conversion into the six-color output signal for displaying the L-sets of XYZ-color spaces in the above-mentioned document 5 is used here by replacing the XYZ disclosed in the document 5 with the L-sets of XYZ-color spaces. Therefore, a description of the means is omitted here.

According to the second embodiment, when the color-image input means is the multi-band camera and the color-image output means is the six-color printer, the same advantages as those according to the first embodiment are obtained.

Figure 23:
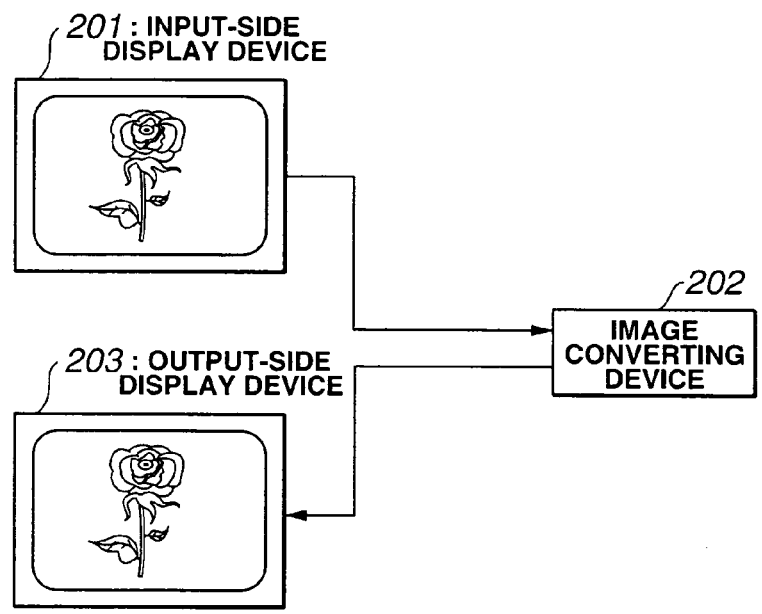
FIG. 23 is a block diagram showing the schematic structure of a spectrum and color reproduction system according to a third embodiment of the present invention.

FIGS. 23 to 31 show the third embodiment. FIG. 23 is a block diagram showing the schematic structure of a spectrum and color reproduction system. According to the third embodiment, the same components as those according to the first and second embodiments are designated by the same reference numerals, a description thereof is omitted here, and only different portions are mainly described.

The spectrum and color reproduction system according to the third embodiment comprises: an input-side display device 201 as color-image input means; an image converting device 202 as color converting means which inputs the same color image as that inputted to the input-side display device 201 and converts the inputted color-image into a color image for outputting to an output-side display device 203; and the output-side display device 203 as the color-image output means which displays the color image converted by the image converting device 202.

The input-side display device 201 is a display device which is used by a creator so as to form the image by computer graphics (CG) and is a display device of the six primary colors, similarly to the six-color display 3 according to the first embodiment. The creator performs processing such as the color adjustment of a CG image on the input-side display device 201, and completes a work.

The 6-primary-color display signal as a color signal for displaying an image on the input-side display device 201 is inputted to the input-side display device 201 itself and is further inputted to the image converting device 202.

The image converting device 202 converts the 6-primary-color display signal inputted from the input-side display device 201, into the 6-primary-color display signal as the color signal for being displayed on the output-side display device 203. Further, the image converting device 202 outputs the conversion result to the output-side display device 203.

The output-side display device 203 is the display device of the six primary colors having the spectrum property different from that of the input-side display device 201, and displays the color image on the screen by the 6-primary-color display signal inputted from the image converting device 202.

Figure 24:
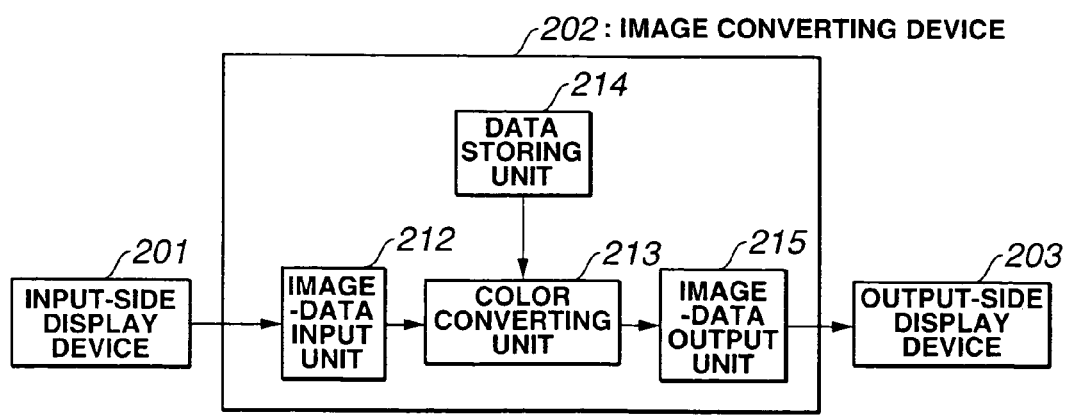
FIG. 24 is a block diagram showing the structure of an image converting device according to the third embodiment.

FIG. 24 is a block diagram showing the structure of the image converting device 202.

The image converting device 202 comprises an image-data input unit 212; a color converting unit 213; a data storing unit 214; and an image-data output unit 215.

The image-data input unit 212 stores the image data of the display signal which is displayed on the input-side display device 201, and outputs the stored data, as the 6-primary-color display signal for every pixel position, to the color converting unit 213.

The color converting unit 213 inputs, from the data storing unit 214, an input-side display profile as the color reproduction property of the color-image input means, the color spatial converting profile, and an output-side display profile as the color reproduction property of the color-image output means, converts the 6-primary-color display signal on the input side which is inputted from the image data input unit 212 into the 6-primary-color display signal on the output side, and outputs the conversion result to the image data output unit 215.

The image-data output unit 215 stores the 6-primary-color display signal inputted from the color converting unit 213, and outputs the stored signal to the output-side display device 203.

Figure 25:
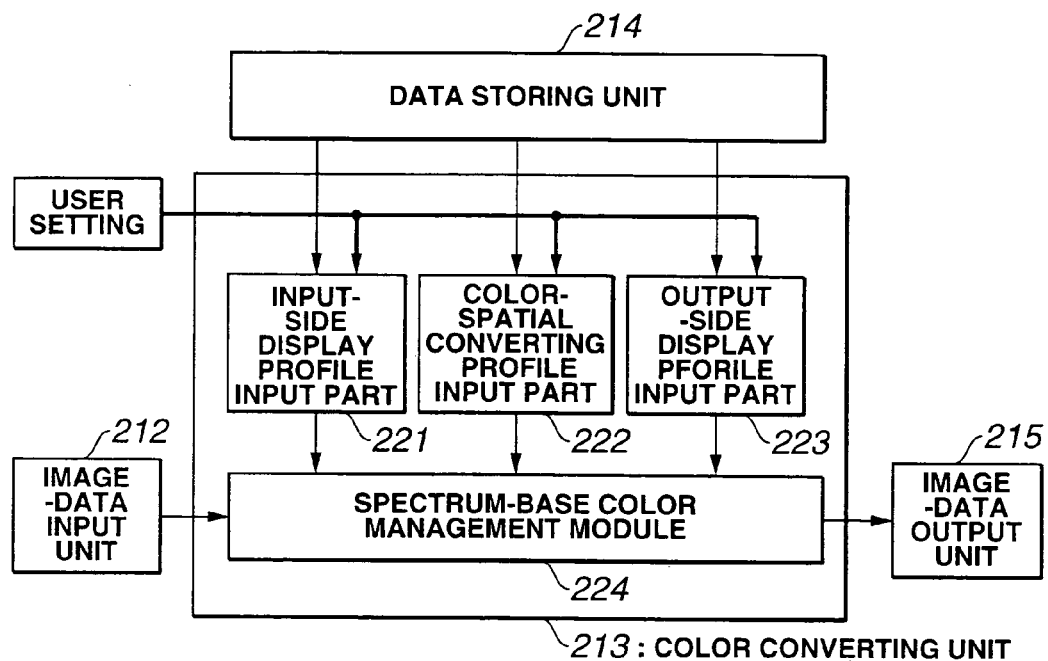
FIG. 25 is a block diagram showing the structure of a color converting unit according to the third embodiment.

FIG. 25 is a block diagram showing the structure of the color converting unit 213.

The color converting unit 213 comprises: an input-side display profile input part 221; a color-spatial converting profile input part 222; an output-side display profile input part 223; and a spectrum-base CMM 224.

The input-side display profile input part 221, the color-spatial converting profile input part 222, and the output-side display profile input part 223 input, respectively, from the data storing unit 214 in accordance with the user setting, the input-side display profile, the color spatial converting profile, and the output-side display profile, and output the data in the individual profiles to the spectrum-base CMM 224.

The spectrum-base CMM 224 converts, into the 6-primary-color display signal on the output side, the 6-primary-color display signal on the input side inputted from the image-data input unit 212 by using the data inputted respectively from the input-side display profile input part 221, the color-spatial converting profile input part 222, and the output-side display profile input part 223.

Figure 26:
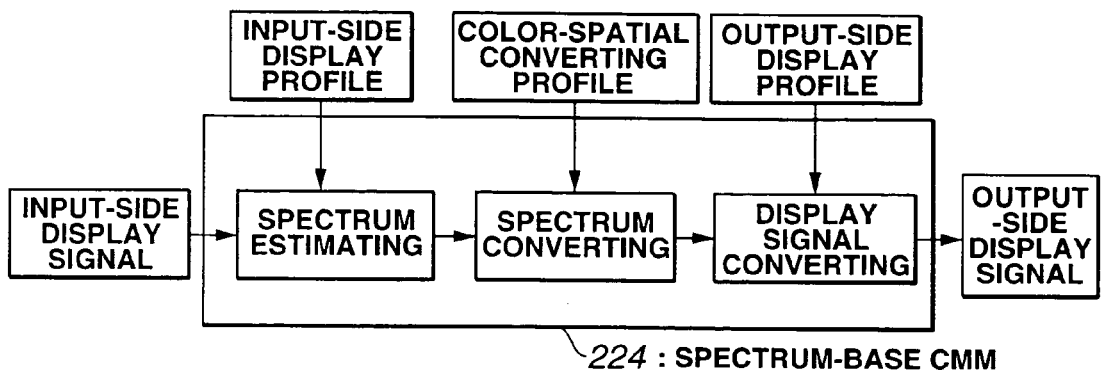
FIG. 26 is a diagram showing the concept for converting an input-side display signal into an output-side display signal by the spectrum-base CMM according to the third embodiment.

FIG. 26 is a diagram showing the concept for converting the input-side display signal into the output-side display signal by using the spectrum-base CMM 224.

The input-side display profile comprises information on a relationship between the input-side display signal and the display spectrum. The input-side display signal is converted into the display spectrum by using the input-side display profile.

The output-side display profile comprises information on a relationship between the output-side display spectrum and the display signal. The output-side display spectrum is converted into the display signal by using the output-side display profile.

Further, the color spatial converting profile comprises the color matching function indicating the color perception property of the human. The input-side display spectrum is converted into the output-side display spectrum in consideration of the color perception property of the human by using the color spatial converting profile.

In the spectrum-base CMM 224, device profiles such as the input-side display profile and the output-side display profile indicate a corresponding relationship between a signal value and the spectrum, and the spectral space is an interface between the profiles, namely, a profile connection space (PCS).

Information of the color matching function for determining the color from the spectrum is designed to be provided by the color spatial converting profile. The spectrum information indicating the physical amount is converted into the color information indicating the psychological amount, independently of the device profiles.

The processing sequence of the spectrum-base CMM 224 is not necessarily restricted to that shown in FIG. 26 and, preferably, the proper processing structure such as the combination of calculating processings is used in accordance with the input/output condition.

The spectrum-base CMM 224 is the same as that shown in FIG. 8 according to the first embodiment, and comprises the algorithm selecting part 31 and the signal converting part 32.

The algorithm selecting part 31 selects a color conversion algorithm used by the signal converting part 32, based on the user setting and the profile data inputted from the input-side display profile input part 221, the color-spatial converting profile input part 222, and the output-side display profile input part 223.

The user setting comprises the setting for selecting any of the spectrum matching and the calorimetric matching, and the user of the image converting device 202 selects one of the matchings upon the color conversion.

When the spectrum matching is selected in the user setting, the algorithm selecting part 31 determines whether or not the color matching function is comprised, as data, in the color-spatial converting profile inputted from the color-spatial converting profile input part 222.

When the color-spatial converting profile does not comprise the color matching function as the data, the algorithm selecting part 31 outputs the algorithm information for using a 21st-model signal processing section 242 (refer to FIG. 27) to the signal converting part 32.

When the color-spatial converting profile comprises the color matching function as the data, the algorithm selecting part 31 outputs the algorithm information for using the 22nd-model signal processing section 243 (refer to FIG. 27) to the signal converting part 32.

When the calorimetric matching is selected in the user setting, the algorithm selecting part 31 inputs the number of sets of color matching functions comprised in the color spatial converting profile inputted from the color-spatial converting profile input part 222.

Figure 27:
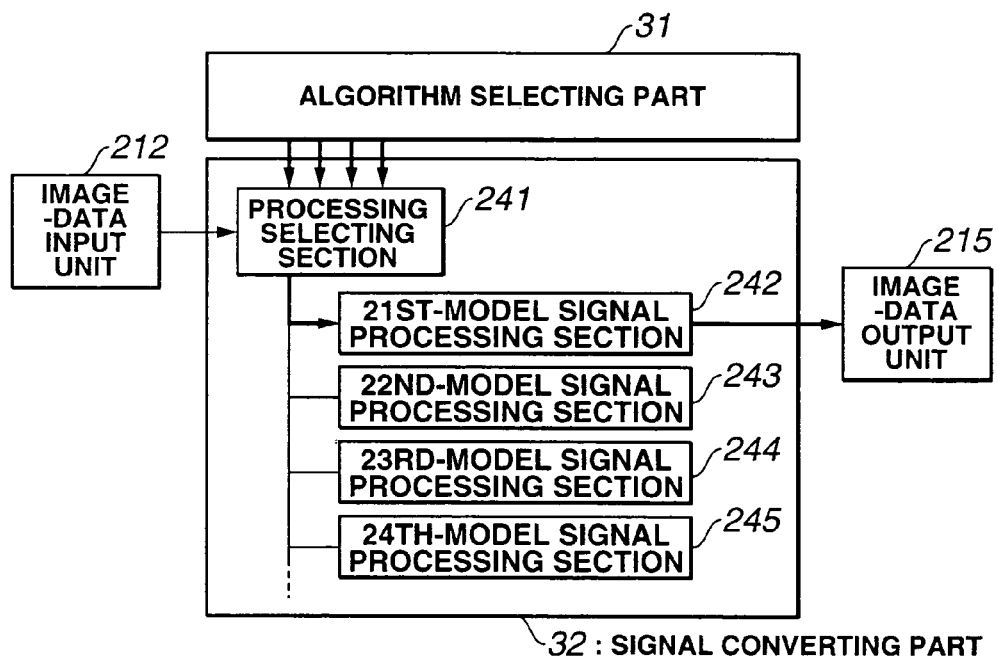
FIG. 27 is a block diagram showing the structure of a signal converting part according to the third embodiment.

When the number of sets of color matching functions is one, the algorithm selecting part 31 outputs the algorithm information for using a 23rd-model signal processing section 244 (refer to FIG. 27).

When the number of sets of color matching functions is two or more, the algorithm selecting part 31 outputs the algorithm information for using a 24th-model signal processing section 245 (refer to FIG. 27).

Then, the algorithm selecting part 31 outputs, to the signal converting part 32, the selected algorithm information, the input-side display profile, the color-spatial converting profile, and the output-side display profile.

The signal converting part 32 converts, into the 6-primary-color display signal on the output side, the 6-primary-color display signal inputted from the image-data input unit 212 by using the input-side display profile, the color-spatial converting profile, and the output-side display profile in accordance with the converting method (one of 21st-to-24th-model signal processing sections 242 to 245) selected based on the algorithm information inputted from the algorithm selecting part 31, and outputs, to the image-data output unit 215, the converted 6-primary-color display signal.

FIG. 27 is a block diagram showing the structure of the signal converting part 32.

The signal converting part 32 comprises a processing selecting section 241 and four model-signal-processing-sections, that is, the 21st-model signal processing section 242, the 22nd-model signal processing section 243, the 23rd-model signal processing section 244, and the 24th-model signal processing section 245.

The processing selecting section 241 selects the model signal processing section for processing based on the algorithm information inputted from the algorithm selecting part 31, and outputs, to the selected model signal processing section, the input-side display profile, the color-spatial converting profile, the output-side display profile, which are inputted from the algorithm selecting part 31 and the 6-primary-color display signal inputted from the image-data input unit 212.

The model signal processing sections input respectively, from the processing selecting section 241, the input-side display profile, the color-spatial converting profile, the output-side display profile, and the 6-primary-color display signal on the input side, converts the 6-primary-color display signal on the input side into the 6-primary-color display signal on the output side, and outputs the signal after the conversion to the image-data output unit 215.

Figure 28:
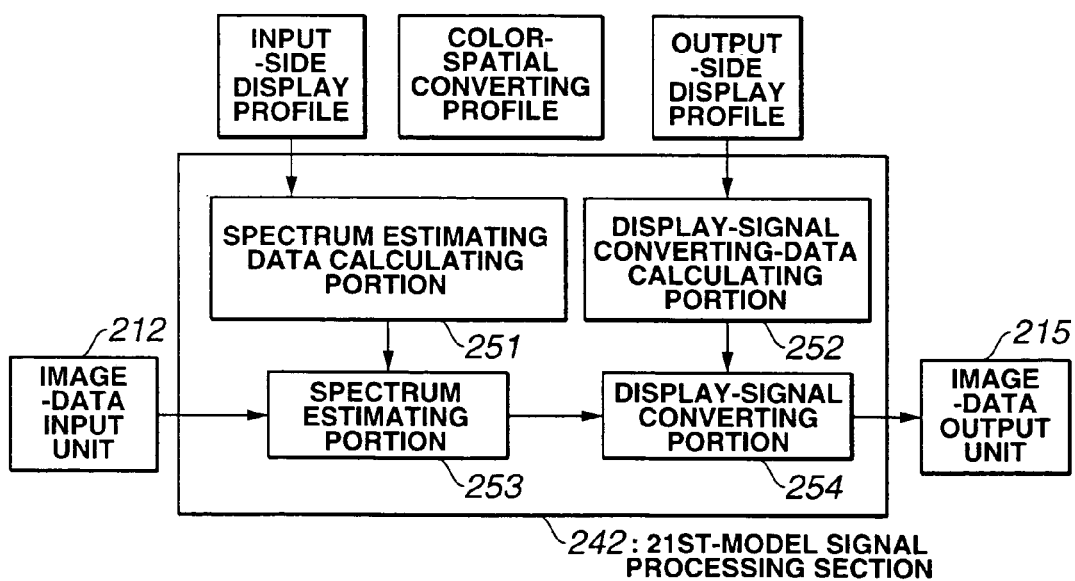
FIG. 28 is a block diagram showing the structure of a 21st-model signal processing section using the least square of the spectrum according to the third embodiment.

FIG. 28 is a block diagram showing the structure of the 21st-model signal processing section 242.

The 21st-model signal processing section 242 comprises: a spectrum estimating data calculating portion 251; a display-signal converting data calculating portion 252; a spectrum estimating portion 253; and a display-signal converting portion 254.

The spectrum estimating data calculating portion 251 calculates the gradation correcting data and the spectrum estimating matrix by using the 6-primary-color spectrum and the gradation property comprised in the inputted input-side display profile, and outputs the calculation result to the spectrum estimating portion 253.

The gradation correcting data are for correcting the 6-primary-color spectrum into the signal value linear to the display luminance.

The spectrum estimating matrix contains (401×6) components for calculating a 401-dimensional display spectrum from the 6-primary-color display signal.

The display-signal converting data calculating portion 252 calculates the 6-primary-color spectrum and the gradation correcting data by using the 6-primary-color spectrum and the gradation property comprised in the inputted output-side display profile, and outputs the calculation result to the display-signal converting portion 254.

The gradation correcting data are for supplying the 6-primary-color display signal for the signal value linear to the display luminance.

The spectrum estimating portion 253 inputs the gradation correcting data and the spectrum estimating matrix from the spectrum estimating data calculating portion 251, performs the gradation correction for the 6-primary-color display signal inputted from the image-data input unit 212, estimates the spectrum by the matrix transformation, calculates the 401-dimensional subject spectrum, and outputs the calculation result to the display-signal converting portion 254.

When the display spectrum on the input side inputted from the spectrum estimating portion 253 is displayed in the 6-primary-color spectrums of the output-side display device 203 as a six-primary-color display on the output side, the display-signal converting portion 254 converts the display spectrum into the 6-primary-color display signal having a minimum error of the spectrum.

Then, the display-signal converting portion 254 corrects the gradation of the 6-primary-color signals by using the gradation correcting data, and outputs the corrected 6-primary-color display signal to the image-data output unit 215.

Figure 29:
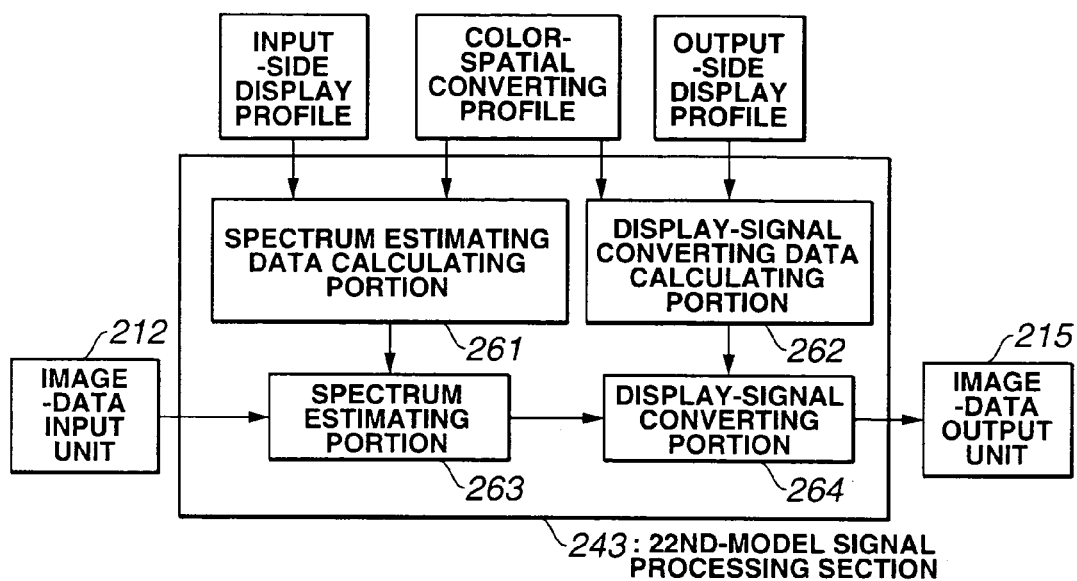
FIG. 29 is a block diagram showing the structure of a 22nd-model signal processing section using the least square of the spectrum with the XYZ restriction according to the third embodiment.

FIG. 29 is a block diagram showing the structure of the 22nd-model signal processing section 243.

The 22nd-model signal processing section 243 has: a spectrum estimating data calculating portion 261, a display-signal converting data calculating portion 262, a spectrum estimating portion 263, and a display-signal converting portion 264.

The spectrum estimating data calculating portion 261 calculates the gradation correcting data, the 6-primary-color spectrum, and the 6-primary-color calorimetric values by using the 6-primary-color spectrums and the gradation property comprised in the inputted input-side display profile and the color matching function comprised in the inputted color-spatial converting profile, and outputs the calculation result to the spectrum estimating portion 263.

The gradation correcting data are for correcting the 6-primary-color-display signal into the signal value linear to the display luminance.

The 6-primary-color spectrum is a matrix containing (401× 6) components for calculating a 401-dimensional display spectrum from the 6-primary-color display signal.

The display-signal converting data calculating portion 262 calculates the 6-primary-color spectrums, the calorimetric values of the 6 primary-colors, and the gradation correcting data by using the 6-primary-color spectrums and the gradation property comprised in the inputted output-side display profile and the color matching function comprised in the inputted color-spatial converting profile, and outputs the calculation result to the display-signal converting portion 264.

The spectrum estimating portion 263 inputs the 6-primary-color spectrums, 6-primary-color colorimetric values, and the gradation correcting data from the spectrum estimating data calculating portion 261, performs the gradation correction for the 6-primary-color display signal inputted from the image-data input unit 212, estimates the spectrum by the matrix transformation, calculates the 401-dimensional display spectrum, and outputs the data to the display-signal converting portion 264.

Under a restriction that the calorimetric values of the input-side display spectrums are correctly displayed, the display-signal converting section 264 converts the display spectrums inputted from the spectrum estimating portion 263 into the 6-primary-color display signals having the minimum error of the spectrums, when the display spectrum is expressed by the linear sum of the 6-primary-color spectrums of the output-side display device 203. The converting method in this case is the same as that of the 2nd-model signal processing section 43 according to the first embodiment and it is not described here.

Then, the display-signal converting section 264 corrects the gradation of the 6-primary-color display signals by using the gradation correcting data and outputs the corrected signals to the image-data output unit 215.

Figure 30:
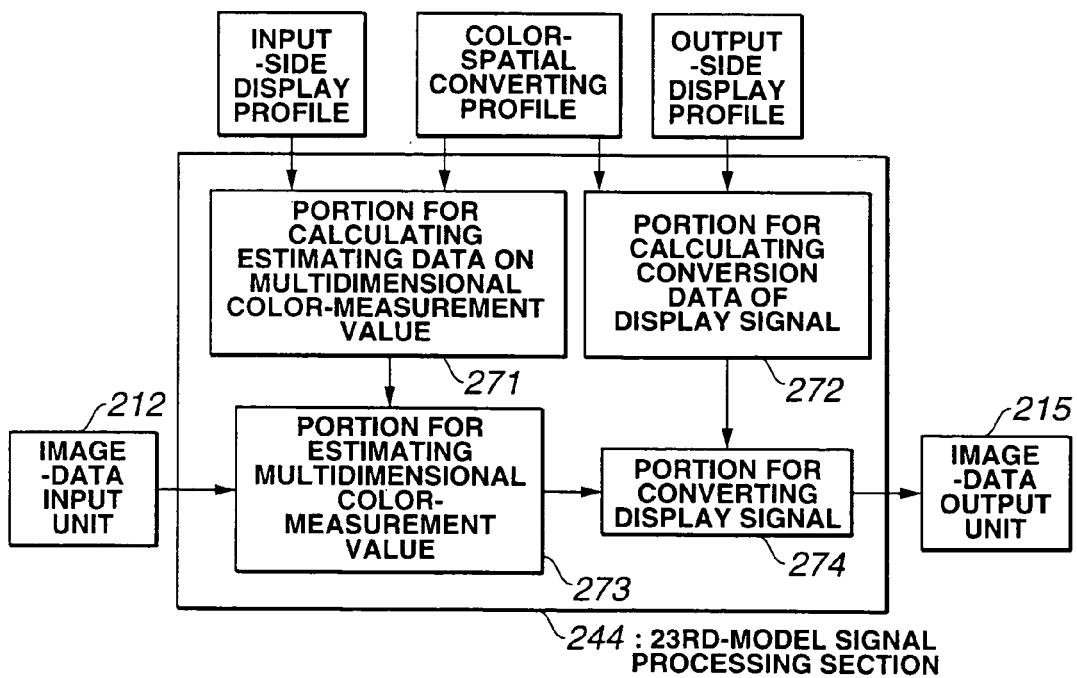
FIG. 30 is a block diagram showing the structure of a 23rd-model signal processing section using the matching of the calorimetric value according to the third embodiment.

FIG. 30 is a block diagram showing the structure of the 23rd-model signal processing section 244.

The 23rd-model signal processing section 244 has: a portion 271 for calculating the estimating data on the multidimensional-colorimetric value; a portion 272 for calculating the conversion data of the display signal; a portion 273 for estimating the multidimensional calorimetric value; and a portion 274 for converting the display signal.

The portion 271 for calculating the estimating data on the multidimensional-colorimetric value calculates a multidimensional calorimetric value matrix and the gradation data by using the 6-primary-color spectrum and the gradation property comprised in the inputted input-side display profile and the color matching function comprised in the inputted color-spatial converting profile, and outputs the calculation result to the portion 273 for estimating the multidimensional-colorimetric value.

Here, the color matching function assumes to contain K ($\leqq 6$) functions, not more than the number of primary colors of the 6-primary-color display. When (K+1) or more functions are described in the color-spatial converting profile, up to 1st to Kth functions are used.

The multidimensional calorimetric value matrix contains (K×6) components for calculating the calorimetric value of the K-dimensional display signal from the 6-primary-color display signal.

That is, the multidimensional colorimetric value estimating matrix is an (N×K) matrix having the components expressed by the following expression 6 when the light-emission spectrums of the primary colors are defined by $p_j(\lambda)$ and the color matching function is defined by $t_k(\lambda)$ $$T_{jk} = \int_{\lambda=380}^{780} t_k(\lambda) P_j(\lambda) d\lambda \quad (j = 1 \text{ to } N, k = 1 \text{ to } K) \quad \text{[Expression 6]}$$

The portion 272 for calculating the conversion data of the display signal calculates the multidimensional colorimetric values and the gradation correcting data of the six primary colors by using the spectrums and the gradation properties of the 6 primary colors comprised in the inputted output-side display profile and the color matching function comprised in the inputted color-spatial converting profile, and outputs the calculation result to the portion 274 for converting the display signal.

The portion 273 for estimating the multidimensional colorimetric value corrects the gradation of the 6-primary-color display signal inputted from the image-data input unit 212 by using the multidimensional calorimetric value estimating matrix inputted from the portion 271 for calculating the estimating data on the multidimensional calorimetric value, converts the signals into the multidimensional colorimetric values by the matrix transformation, and outputs the converted value to the portion 274 for converting the display signal.

The portion 274 for converting the display signal is the same as the portion 74 for converting the display signal shown in FIG. 12 according to the first embodiment and a description thereof is omitted here.

Then, the portion 274 for converting display signal corrects the gradation of the 6-primary-color signal by using the gradation correcting data, and outputs the correction result to the image-data output unit 215.

Figure 31:
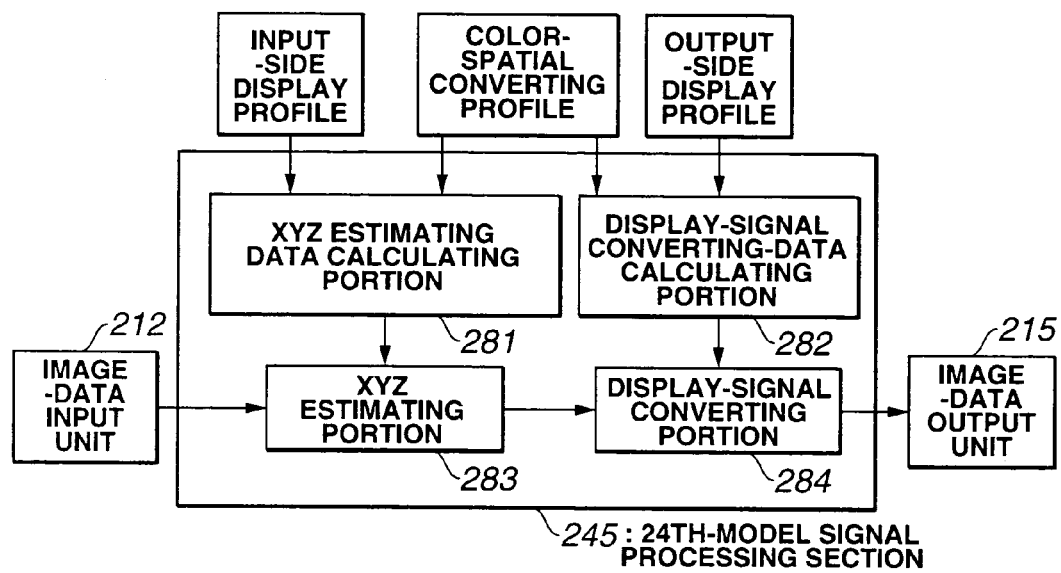
FIG. 31 is a block diagram showing the structure of a 24th-model signal processing section using the matching of the statistic calorimetric value according to the third embodiment.

FIG. 31 is a block diagram showing the structure of the 24th-model signal processing section 245.

The 24th-model signal processing section 245 comprises: an XYZ estimating data calculating portion 281; a display-signal converting-data calculating portion 282; an XYZ estimating portion 283; and a display-signal converting portion 284.

The XYZ estimating data calculating portion 281 calculates the L-XYZ estimating matrix and the gradation correcting data by using the 6-primary-color spectrum and the gradation property comprised in the inputted input-side display profile and L-sets of XYZ-color-matching-functions comprised in the inputted color-spatial converting profile, and outputs the calculation result to the XYZ estimating portion 283.

The L-XYZ estimating matrix has L matrixes containing (3×6) components for calculating the XYZ-color-space from the 6-primary-color display signal. The calculation of the L-XYZ estimating matrix is the same as that of the matrix for estimating the multidimensional calorimetric value in the 23rd-model signal processing section 244 and a description thereof is omitted here.

The display-signal converting-data calculating portion 282 and the display-signal converting portion 284 are respectively the same as those of the display-signal converting-data calculating portion 82 and the display-signal converting portion 84 in the 4th-model signal processing section 45 shown in FIG. 13 according to the first embodiment, and a description thereof is omitted here.

According to the third embodiment, when the color-image input means and the color-image output means are display devices, the same advantages as those according to the first and second embodiments are obtained.

The first embodiment describes the system in which the multi-band camera is the color-image input means and the 6-primary-color display is the color-image output means, the second embodiment describes the system in which the multi-band camera is the color-image input means and the 6-primary-color printer is the color-image output means, and the third embodiment describes the system in which the input-side display device is the color-image input means and the output-side display device is the color-image output means. However, the present invention is not limited to the combinations.

For example, it is advantageous to use a system in which a display (input-side display device) is the color-image input means and a printer is the color-image output means, a system in which a printer is the color-image input means and the printer is the color-image output means, a system in which a camera is replaced with a scanner, and a system in which a printer is replaced with a printing machine.

Further, a system is advantageous as well, including an arbitrary number of devices which is obtained by combining the above combinations.

The algorithm in the signal processing in the signal converting part is not limited to those described according to the first to third embodiments. A module having the similar interface can be replaced with arbitrary signal processing means or be added.

The first to third embodiments do not describe the difference of color appearance which is caused in the case in which the rendering illumination-light is different from the illumination light under the observation environment or the peripheral observation environment. However, the present invention can combine correcting processing by using the rendering illumination-light, the information on the observation illumination-light, and a model of the color appearance.

Figure 32:
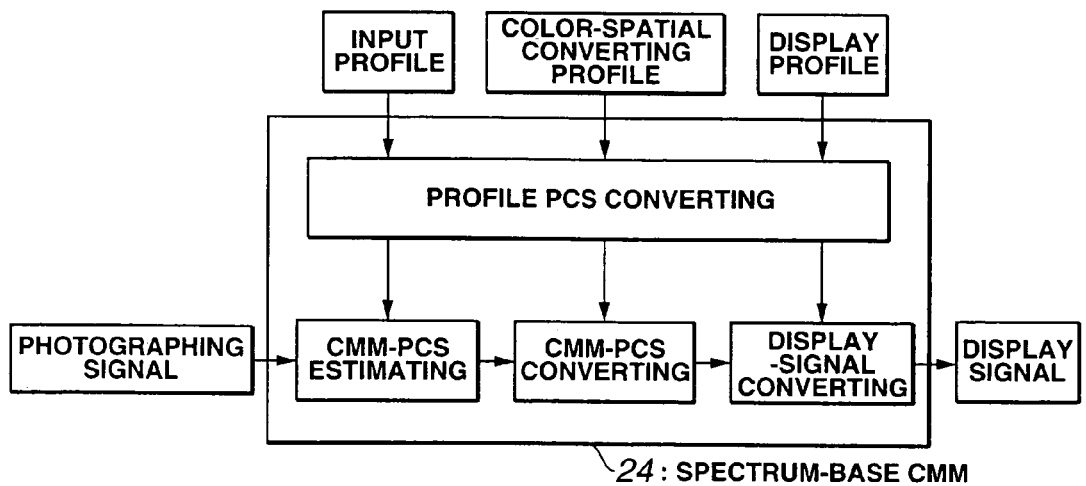
FIG. 32 is a diagram showing the concept for converting a photographing signal into a display signal by using the spectrum-base CMM according to a fourth embodiment of the present invention.

FIGS. 32 to 37 show the fourth embodiment, FIG. 32 is a diagram showing the concept for converting the photographing signal into the display signal by using the spectrum-base CMM. According to the fourth embodiment, the same portions as those according to the first to third embodiments are designated by the same reference numerals, a description thereof is omitted, and only different portions are mainly described.

Basically, a spectrum and color reproduction system according to the fourth embodiment has the same structure as that according to the first embodiment and, however, has the structures of the spectrum-base CMM and the data structures of the profiles, which are different from those according to the first embodiment.

Referring to FIG. 32, the input profile contains information on a relationship between the photographing signal and any of the subject spectral reflectance as the PCS of the input profile, the subject spectrum, and the subject colorimetric value. The photographing signal can be converted into any of the subject spectral reflectance, the subject spectrum, and the subject calorimetric value by using the input profiles.

The display profile contains information on a relationship between the display signal and any of the display spectrum as the PCS of the display profile and the display calorimetric value. The display spectrum or the display calorimetric value can be converted into the display signal by using the display profile.

The color spatial converting profile contains, as data of the PCS in the color spatial converting profile, the rendering illumination-light spectrum used for calculating the spectrum for the spectral reflectance and in case of need the color matching function indicating the color perception property of the human being. The spectrum for the spectral reflectance is calculated under predetermined illumination light and the spectrum can be converted into the spectrum on the display side in consideration of the color perception property of the human being by using the color spatial converting profile.

In the profile PCS conversion, the PCSs of the input profile, the color spatial converting profile, and the display profile are converted into CMM-PCS data used by the spectrum CMM, and the conversion results are outputted for the CMM-PCS estimation, the CMM-PCS conversion, and the display-signal conversion.

As mentioned above, in the spectrum-base CMM 24, device profiles such as the input profile and the display profile supply a corresponding relationship between the signal value and the respective profile PCSs. In the profile PCS conversion, the PCSs of the profiles are respectively converted into the CMM-PCS data. Although not directly, the CMM-PCS data is an interface between the profiles.

In the CMM-PCS estimation, the CMM-PCS conversion, and the display-signal conversion, data in the input profile having the interface as the CMM-PCS data, in the color spatial converting profile, and in the display profile are inputted from the profile PCS conversion. Further, the same processing as that shown in FIG. 7 according to the first embodiment is performed for the CMM-PCS data.

The processing sequence of the spectrum-base CMM 24 is not necessarily as shown in FIG. 32 and, preferably, may be one including the combination of the calculation processings in accordance with the input/output condition.

In the input profile, the PCS can be any of arbitrary spectral reflectance, spectrum, and colorimetric value. In the color spatial converting profile and the display profile, the PCS can any of arbitrary spectrum or colorimetric value.

The profiles contain, as PCS information, information for estimating the space used as the PCS. The PCS information prescribes the PCSs of the profiles as partial spaces of the CMM-PCS.

That is, when spatial data on the CMM-PCS is designated by $S_i^{(CMM)}$ (i=1 to R') and the PCS of the profile is designated by $S_j^{(PRO)}$ (j=1 to R), the following expression 7 is obtained.

$$S_j^{(PRO)} = \sum_{i=1}^{R'} P_{ji} S_i^{(CMM)} \quad (j = 1 \text{ to } R) \qquad \text{[Expression 7]}$$

That is, the profiles contain, as the PCS information, a basic function $\rho_{ji}$ (i=1 to R', j=1 to R) of the PCS having a relationship between the PCS of the profile and the CMM-PCS space.

The basic function $\rho_{ji}$ (i=1 to R', j=1 to R) uses arbitrary data. However, when the basic function $\rho_{ji}$ (i=1 to R', j=1 to R) uses previously-registered pieces of data, an identifier of the data can be comprised as the PCS information in place of the actual data.

It is assumed that the CIE 1931 color matching function and the identifier thereof are previously registered as the data for prescribing a colorimetric value CIE 1931 XYZ. In this case, the CIE 1931 color matching functions $x(\lambda)$, $y(\lambda)$, and $z(\lambda)$ correspond to valuables $\rho_{1i}$, $\rho_{2i}$, and $\rho_{3i}$ (i=1 to R) in the expression 7, respectively.

Figure 33:
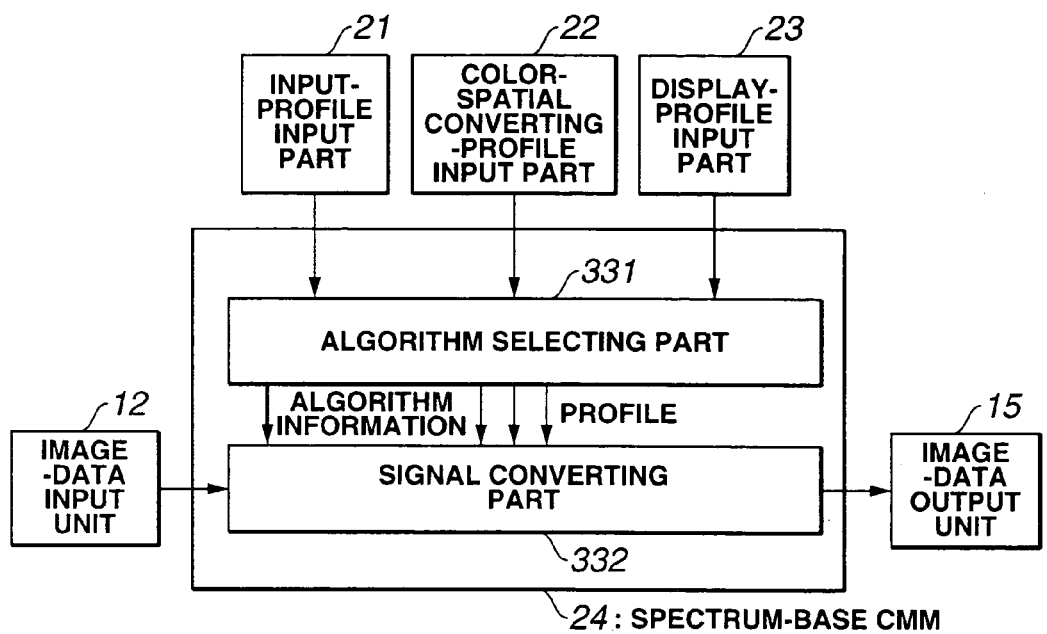
FIG. 33 is a block diagram showing the structure of the spectrum-base CMM according to the fourth embodiment.

FIG. 33 is a block diagram showing the structure of the spectrum-base CMM 24.

The spectrum-base CMM 24 comprises: an algorithm selecting part 331 as processing selecting means; and a signal converting part 332.

The algorithm selecting part 331 selects the CMM-PCS data used by the signal converting part 332 from the profile data inputted respectively from the input-profile input part 21, the color-spatial converting profile input part 22, and the display profile input part 23.

The CMM-PCS data indicates the spectral space or the space having the calorimetric values. In the spectral space, the CMM-PCS data indicates a 401-dimensional space in which a range of 380 to 780 nm is sectioned at an interval of 1 nm. In the space having the colorimetric values, the CMM-PCS data indicate a space having an arbitrary-dimensional colorimetric value prescribed by an arbitrary color matching function.

First, the algorithm selecting part 331 checks the PCSs of the input profile and the display profile and, when the PCSs of both the profiles have the colorimetric values, it selects a lower-dimensional PCS as the CMM-PCS data.

In this case, in the conversion from a higher-dimensional colorimetric value to the lower-dimensional calorimetric value, the lower-dimensional color matching function is calculated by the matrix transformation using a matrix with the approximation of the least square from the higher-dimensional color matching function.

When one of the PCSs of the input profile and the display profile has the colorimetric value and the other has the spectrum, the algorithm selecting part 331 selects the colorimetric value as the PCS.

In this case, in the conversion from the spectrum to the colorimetric value, the similar calculation to that of the expression 2 is performed by using the color matching function of the profile having the colorimetric value as the PCs.

Further, when the PCSs of both the input profile and the display profile have the spectrums, the algorithm selecting part 331 selects the spectrum as the CMM-PCS data. However, when the PCS of the input profile is the spectral reflectance, the rendering illumination-light spectrum is inputted from the color spatial converting profile so as to set the spectrum and then the CMM-PCS is calculated by the above means.

When the spectral spaces of the input profile and the display profile are different from the spectral spaces of the CMM-PCS data, the PCS information for prescribing the spectral space of the PCS is used for the conversion from the spectral spaces of the profiles into those of the CMM-PCs.

When the CMM-PCS data is the calorimetric value, the algorithm selecting part 331 outputs the algorithm information for using a 31st-model signal processing section 342 (refer to FIG. 34) to the signal converting part 332.

When the CMM-PCS data is the spectrum, the algorithm selecting part 331 determines whether or not the color spatial converting profile comprises the color matching function.

When the color spatial converting profile comprises the color matching function as data, the algorithm selecting part 331 outputs the algorithm information necessary for using a 32nd-model signal processing section 343 (refer to FIG. 34) to the signal converting part 332.

When the color spatial converting profile does not comprise the color matching function as data, the algorithm selecting part 331 outputs the algorithm information necessary for using a 33rd-model signal processing section 344 (refer to FIG. 34) to the signal converting part 332.

The algorithm selecting part 331 outputs, to the signal converting part 332, the selected algorithm information, the input profile, the color spatial converting profile, and the display profile.

The signal converting part 332 converts the 16-band photographing signal inputted from the image-data input unit 12 into the six-color display signal by using the input profile, the color spatial converting profile, and the display profile, through the converting method (one of the 31st-to-33rd-model signal processing sections 342 to 344) selected based on the algorithm information inputted from the algorithm selecting part 331. Further, the signal converting part 332 outputs the converted 6-primary-color display signal to the image-data output unit 15.

Figure 34:
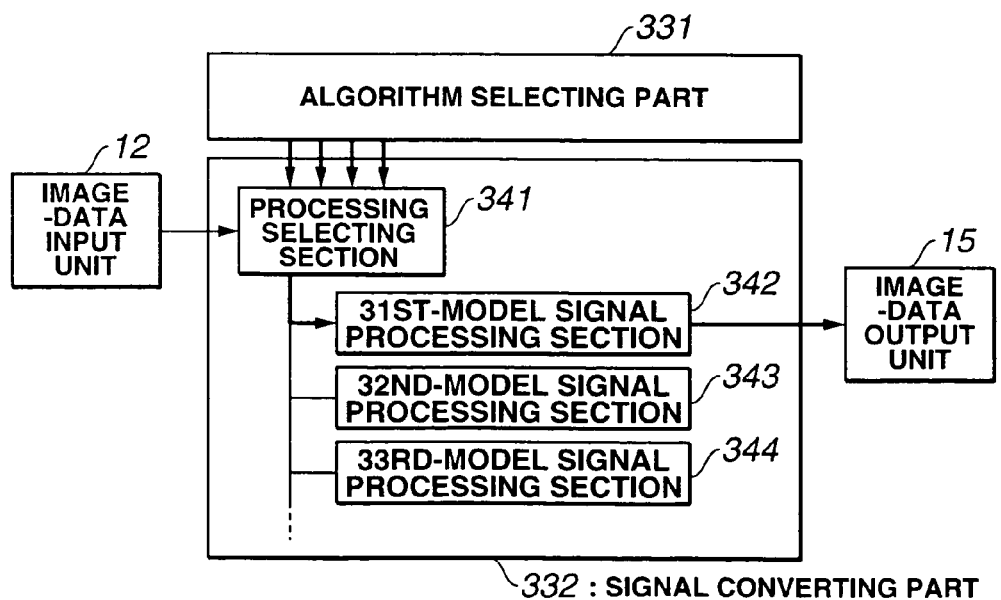
FIG. 34 is a block diagram showing the structure of a signal converting part according to the fourth embodiment.

FIG. 34 is a block diagram showing the structure of the signal converting part 332.

The signal converting part 332 comprises a processing selecting section 341, and three model-signal-processing-sections of the 31st-model signal processing section 342, the 32nd-model signal processing section 343, and a 33rd-model signal processing section 344.

The signal converting section 341 outputs, to a predetermined model signal processing section, the input profile, the color spatial converting profile, and the display profile that are inputted from the algorithm selecting part 331 and the 16-band photographing signal that is inputted from the image-data input unit 12, based on the algorithm information inputted from the algorithm selecting part 331.

The model signal processing sections input from the processing selecting section 341 the input profile, the color spatial converting profile, and the display profile, and the 16-band photographing signal, converts the 16-band photographing signal into the 6-color display signal, and outputs the converted signal to the image-data output unit 15.

Figure 35:
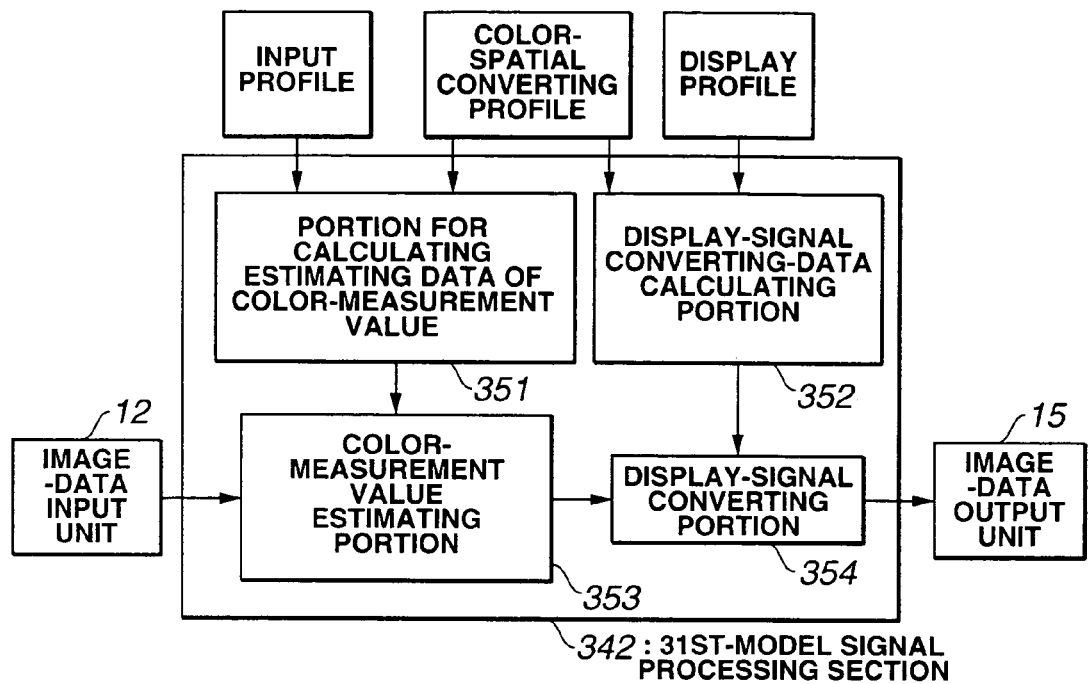
FIG. 35 is a block diagram showing the structure of a 31st-model signal processing section using the matching of the colorimetric value according to the fourth embodiment.

FIG. 35 is a block diagram showing the structure of the 31st-model signal processing section 342.

The 31st-model signal processing section 342 comprises: a portion 351 for calculating the estimating data of the calorimetric value; a display-signal converting data calculating portion 352; a calorimetric value estimating portion 353; and a display-signal converting portion 354.

The portion 351 for calculating the estimating data of the colorimetric value outputs, to the calorimetric value estimating portion 353, the calorimetric value estimating matrix and the gradation correcting data which are comprised in the inputted input profile.

The calorimetric value estimating matrix is a matrix having (K×16) components for calculating a K-dimensional subject calorimetric value from the 16-band photographing signal. The colorimetric value estimating matrix is supplied as data in the input profile. Alternatively, the colorimetric value is calculated from the camera spectral sensitivity in the input profile, the photographing illumination-light spectrum, and the statistic data of the subject spectral reflectance, and the rendering illumination-light spectrum and the color matching function in the color spatial converting profile.

The gradation correcting data is calculated by the same processing as that according to the first embodiment.

The display-signal converting data calculating portion 352 outputs, to the display-signal converting portion 354, the calorimetric values of the 6 primary colors and the gradation correcting data comprised in the inputted display-profile.

The colorimetric values of the 6 primary colors are supplied as data in the display profile, or are calculated from the 6-primary-color spectrum in the display profile and the color matching function in the color spatial converting profile.

The gradation correcting data is calculated by the same processing as that according to the first embodiment.

The calorimetric value estimating portion 353 inputs the gradation correcting data and the calorimetric value estimating matrix from the portion 351 for calculating the estimating data of the colorimetric value, corrects the gradation of the 16-band photographing signal inputted from the image-data input unit 12, estimates the calorimetric values by the matrix transformation, calculates a K-dimensional calorimetric value of the subject, and outputs the calculation result to the display-signal converting portion 354.

The display-signal converting portion 354 converts the subject colorimetric values inputted from the calorimetric value estimating portion 353 into the 6-primary-color display signal for the accurate display on the six-primary-color display 3. The means for converting the subject calorimetric values into the 6-primary-color display signal is the same as that in the 3rd-model signal processing section 44 according to the first embodiment and a description thereof is omitted here.

Then, the display-signal converting portion 354 corrects the gradation of the 6-primary-color signal by using the gradation correcting data, and outputs the correction result to the image-data output unit 15.

Figure 36:
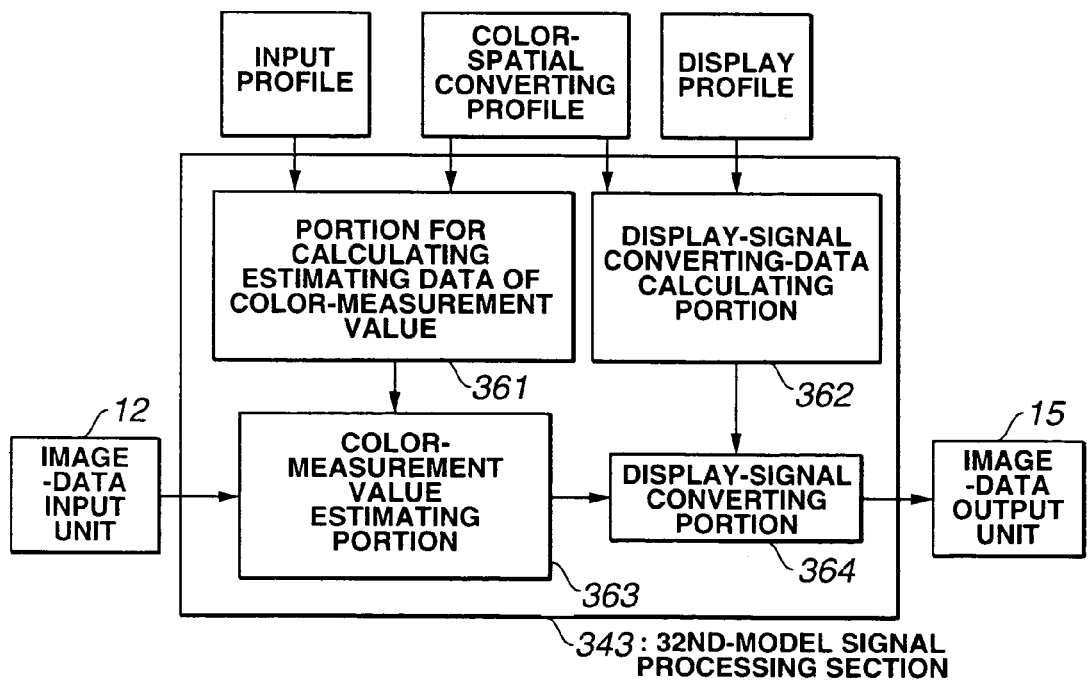
FIG. 36 is a block diagram showing the structure of a 32nd-model signal processing section using the matching of the colorimetric value according to the fourth embodiment.

FIG. 36 is a block diagram showing the structure of the 32nd-model signal processing section 343.

The 32nd-model signal processing section 343 comprises; a portion 361 for calculating the estimating data of the colorimetric value; a display-signal converting data calculating portion 362; a colorimetric value estimating portion 363; and a display-signal converting portion 364.

Thereamong, the colorimetric value estimating portion 363 and the display-signal converting portion 364 are the same as the colorimetric value estimating portion 353 and the display-signal converting portion 354 in the 31st-model signal processing section 342, and a description thereof is omitted here.

The portion 361 for calculating the estimating data of the colorimetric value calculates the colorimetric value estimating matrix and the gradation correcting data by using the camera spectral sensitivity in the input profile, the photographing illumination-light spectrum, and the statistic data of the spectral reflectance of the subject comprised in the inputted input-profile and the color matching function comprised inputted color-spatial converting profile, and outputs the calculation result to the calorimetric value estimating portion 363.

The display-signal converting data calculating portion 362 calculates the colorimetric values of the 6 primary colors and the gradation correcting data by using the 6-primary-color spectrum and the gradation property comprised in the inputted display-profile and the color matching function comprised in the inputted color-spatial converting profile, and outputs the calculation result to the display-signal converting portion 364.

Figure 37:
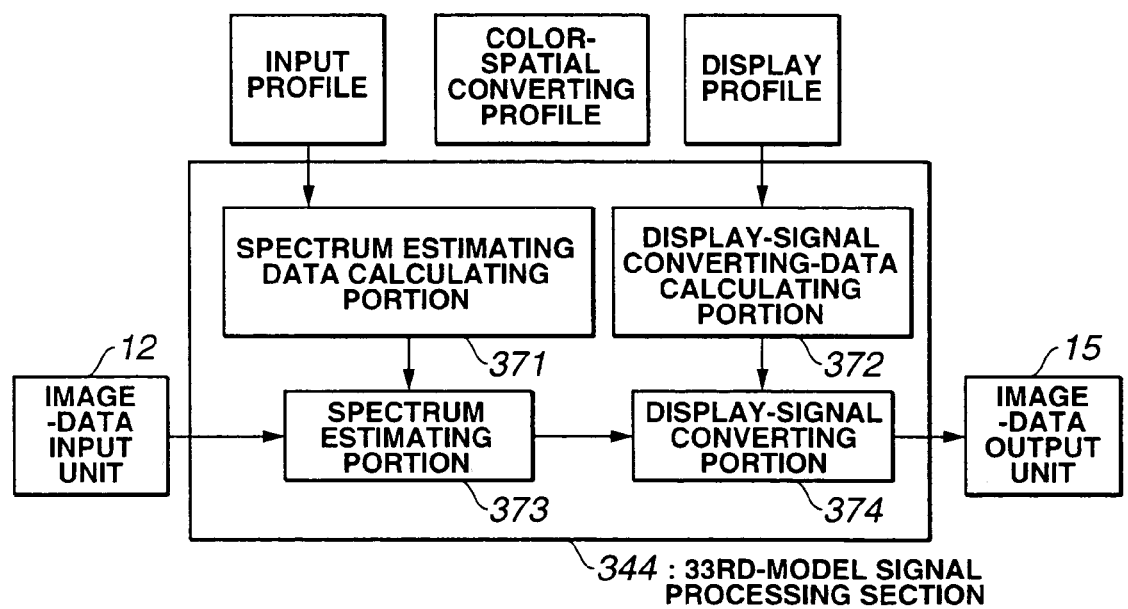
FIG. 37 is a block diagram showing the structure of a 33rd-model signal processing section using the spectrum matching according to the fourth embodiment.

FIG. 37 is a block diagram showing the structure of the 33rd-model signal processing section 344.

The 33rd-model signal processing section 344 comprises: a spectrum estimating data calculating portion 371; a display-signal converting data calculating portion 372; a spectrum estimating portion 373; and a display-signal converting portion 374.

Thereamong, the spectrum estimating portion 373 and the display-signal converting portion 374 are the same as the spectrum estimating portion 53 and the display-signal converting portion 54 in the 1st-model signal processing section 42 according to the first embodiment and a description thereof is omitted here.

The spectrum estimating data calculating portion 371 calculates, by using the inputted input-profile, the spectrum estimating matrix and the gradation correcting data which are prescribed by the CMM-PCS, and outputs the calculation result to the spectrum estimating portion 373.

The display-signal converting data calculating portion 372 calculates, by using the inputted display-profile, the 6-primary-color display spectrum and the gradation correcting data which are prescribed by the CMM-PCS, and outputs the calculation result to the display-signal converting portion 374.

According to the fourth embodiment, the same advantages as those according to the first to third embodiments are obtained. Further, the data described in the color reproduction property can be described with an accuracy matching the precision of a measurement instrument or the reproducing purpose by providing the information having a corresponding relationship among the arbitrary spectral reflectance, spectrum, and calorimetric value as the color reproduction property of the color-image input/output means.

The different color-matching functions are freely used in accordance with the difference in angles of a field-of-view and with three or more calorimetric values in consideration of the variation in the color matching functions due to the individual differences.

Further, the colorimetric value as the color reproduction property realizes the system with the compatibility with the current color-management system.

The present invention is not limited to the first to the fourth embodiments and can variously be modified or applied without departing the range of the essentials of the present invention.

INDUSTRIAL APPLICABILITY

As mentioned above, according to the present invention, the spectrum and color reproduction system precisely reproduces the spectrum and the color of the color image which is inputted by the color-image input means.

Further, according to the present invention, the spectrum and color reproduction system prevents the incompatibility with the current color reproduction system via the color space of three primary colors.

The invention claimed is:
1. A spectrum and color reproduction system, comprising: a color-image input section;

a color-image output section; and a color converting section which converts a color signal from the color-image input section into a color signal for the color-image output section by using:
- a color reproduction property of the color-image input section which comprises information on a relationship between the color signal from the color-image input section and one of a spectrum and a spectral reflectance;
- a color reproduction property of the color-image output section which comprises information on a relationship between the color signal for the color-image output section and one of a spectrum and a spectral reflectance; and
- a color spatial converting property comprising at least one of a color matching function and an illumination-light spectrum which prescribes a reflection spectrum for the spectral reflectance;

wherein the color converting section comprises processing selecting section which selects a color converting algorithm based on a number of sets of color matching functions comprised in the color spatial converting property, and the color converting section converts the color signal from the color-image input section into the color signal for the color-image output section based on the selected color converting algorithm.

2. A spectrum and color reproduction system comprising:
a color-image input section;
a color-image output section; and
a color converting section which converts a color signal from the color-image input section into a color signal for the color-image output section by using:
- a color reproduction property of the color-image input section which comprises information on a relationship between the color signal from the color-image input section and one of a spectrum, a spectral reflectance, and a calorimetric value;
- a color reproduction property of the color-image output section which comprises information on a relationship between the color signal for the color-image output section and one of spectrum, a spectral reflectance, and a calorimetric value; and
- a color spatial converting property comprising at least one of a color matching function and an illumination-light spectrum which prescribes a reflection spectrum for the spectral reflectance, wherein the color converting section comprises a processing selecting section which selects a color converting algorithm based on a corresponding relationship, which is supplied by the color reproduction property, between a signal value and any of the arbitrary spectral reflectance, spectrum, and calorimetric value.

3. The system according to claim 2, wherein the processing selecting unit selects:
- a color converting algorithm which calculates a calorimetric value from the color signal from the color-image input section to convert the color signal from the color-image input section to the color signal for the color-image output section, if at least one of the color reproduction property of the color-image input section and the color reproduction property of the color-image output section includes information on a relationship between the color signal and an arbitrary calorimetric value; and
- a color converting algorithm which calculates a spectrum from the color signal from the color-image input section to convert the color signal from the color-image input section to the color signal for the color-image output section, if the color reproduction property of the color-image input section includes information on a relationship between the color signal from the color-image input section and one of an arbitrary spectral reflectance and spectrum, and the color reproduction property of the color-image output section includes information on a relationship between the color signal for the color-image output section and an arbitrary spectrum.

4. A spectrum and color reproduction method, comprising:
converting a color signal from a color-image input section into a color signal for a color-image output section, by using:
- a color reproduction property of the color-image input section which comprises information on a relationship between the color signal from the color-image input section and one of a spectrum and a spectral reflectance;
- a color reproduction property of the color-image output section which comprises information on a relationship between the color signal for the color-image output section and one of a spectrum and a spectral reflectance; and
- a color spatial converting property comprising at least one of a color matching function and an illumination-light spectrum which prescribes a reflection spectrum for the spectral reflectance;

wherein converting the color signal comprises selecting a color converting algorithm based on a number of sets of color matching functions comprised in the color spatial converting property, and the color signal from the color-image input section is converted into the color signal for the color-image output section based on the selected color converting algorithm.

5. A spectrum and color reproduction method, comprising:
converting a color signal from a color-image input section into a color signal for a color-image output section, by using:
- a color reproduction property of the color-image input section which comprises information on a relationship between the color signal from the color-image input section and one of a spectrum, a spectral reflectance, and a calorimetric value;
- a color reproduction property of the color-image output section which comprises information on a relationship between the color signal for the color-image output section and one of spectrum, a spectral reflectance, and a calorimetric value; and
- a color spatial converting property comprising at least one of a color matching function and an illumination-light spectrum which prescribes a reflection spectrum for the spectral reflectance, wherein converting the color signal comprises selecting a color converting algorithm based on a corresponding relationship, which is supplied by the color reproduction property, between a signal value and any of the arbitrary spectral reflectance, spectrum, and calorimetric value.

6. The method according to claim 5, wherein selecting the color converting algorithm comprises selecting:
- a color converting algorithm which calculates a calorimetric value from the color signal from the color-image input section to convert the color signal from the color-image input section to the color signal for the color-image output section, if at least one of the color reproduction property of the color-image input section and the color reproduction property of the color-image output section includes information on a relationship between the color signal and an arbitrary calorimetric value; and a color converting algorithm which calculates a spectrum from the color signal from the color-image input section to convert the color signal from the color-image input section to the color signal for the color-image output section, if the color reproduction property of the color-image input section includes information on a relationship between the color signal from the color-image input section and one of an arbitrary spectral reflectance and spectrum, and the color reproduction property of the color-image output section includes information on a relationship between the color signal for the color-image output section and an arbitrary spectrum.

* * * * *

UNITED STATES PATENT AND TRADEMARK OFFICE
CERTIFICATE OF CORRECTION

PATENT NO. : 7,450,158 B2  Page 1 of 1
APPLICATION NO. : 10/492260
DATED : November 11, 2008
INVENTOR(S) : Kenro Oshawa et al.

It is certified that error appears in the above-identified patent and that said Letters Patent is hereby corrected as shown below:

On the title page:

Under Item (73) Assignee; after

"National Institute of Information and Communication Technology, Kaganei-shi (JP)"

insert: (i) --Olympus Corporation, Tokyo (JP)--.

(ii) --Matsushita Electric Industrial Co., Ltd. Osaka (JP)--.

Signed and Sealed this

Twenty-eighth Day of September, 2010

David J. Kappos
*Director of the United States Patent and Trademark Office*